Figure 5:
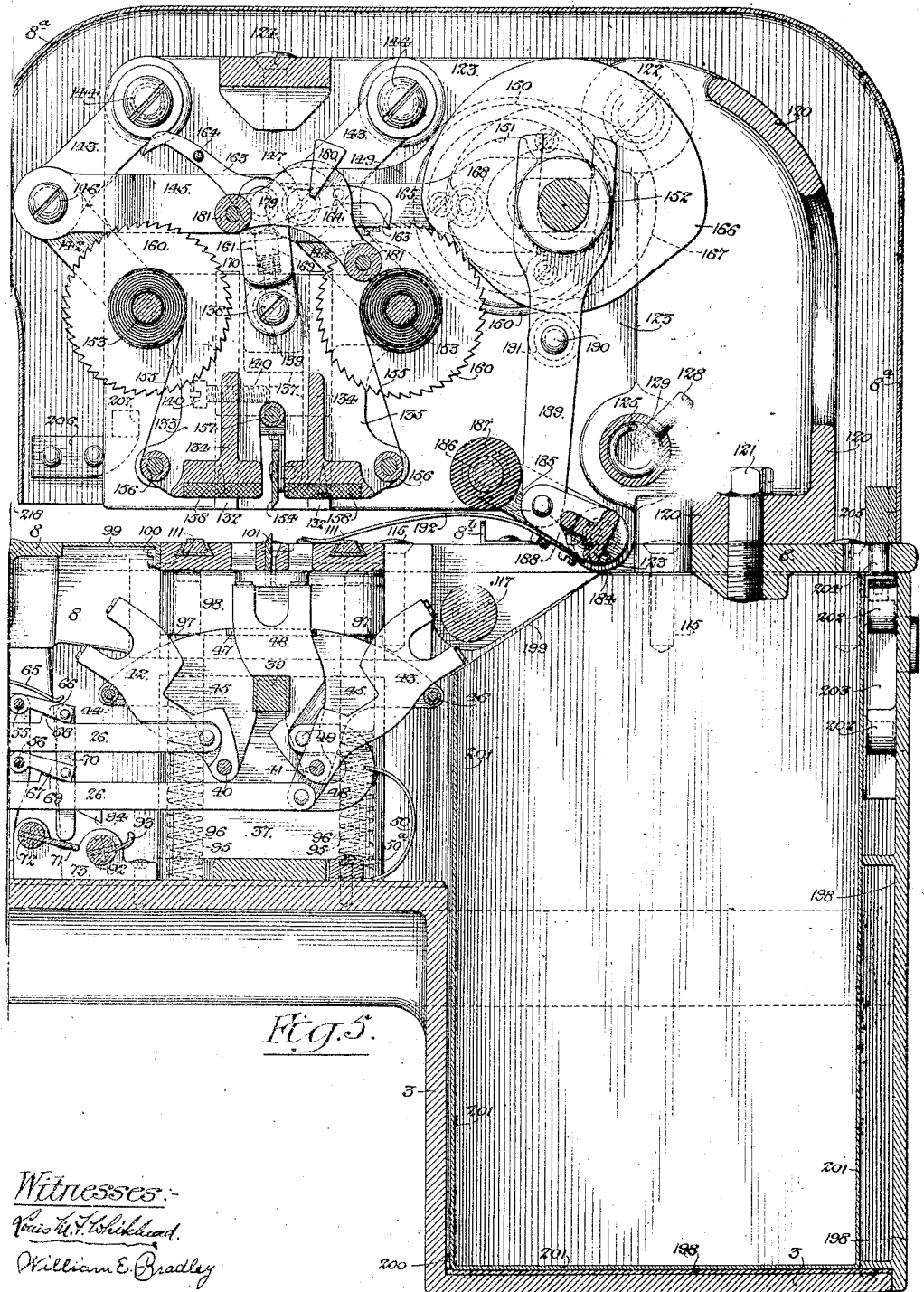

F. N. BREWER, S. B. TILY, J. G. REHFUSS & M. O. REHFUSS.
SALES RECORDING MACHINE.
APPLICATION FILED JUNE 21, 1902.
1,045,118.
Patented Nov. 26, 1912.
12 SHEETS—SHEET 1.
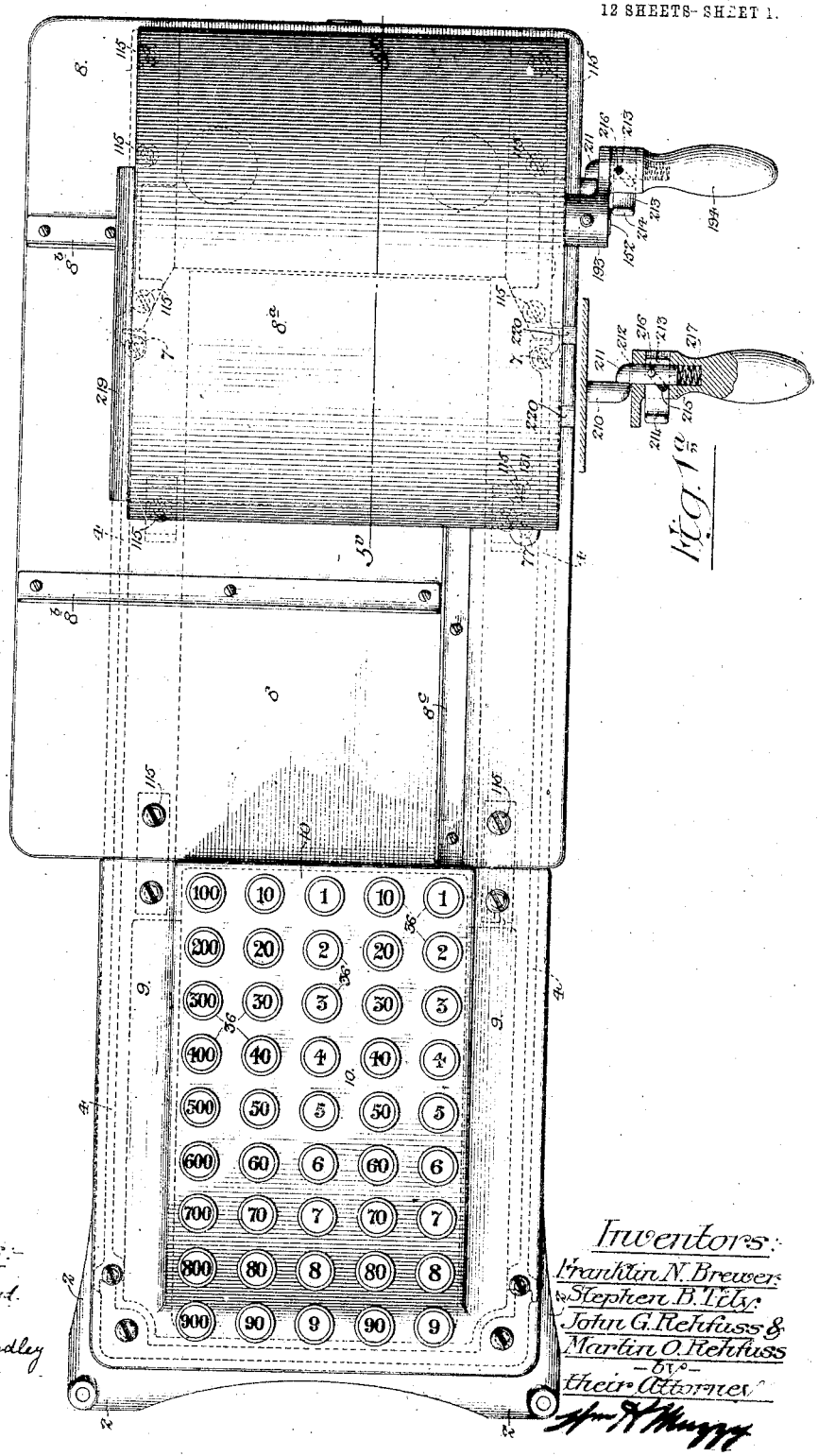

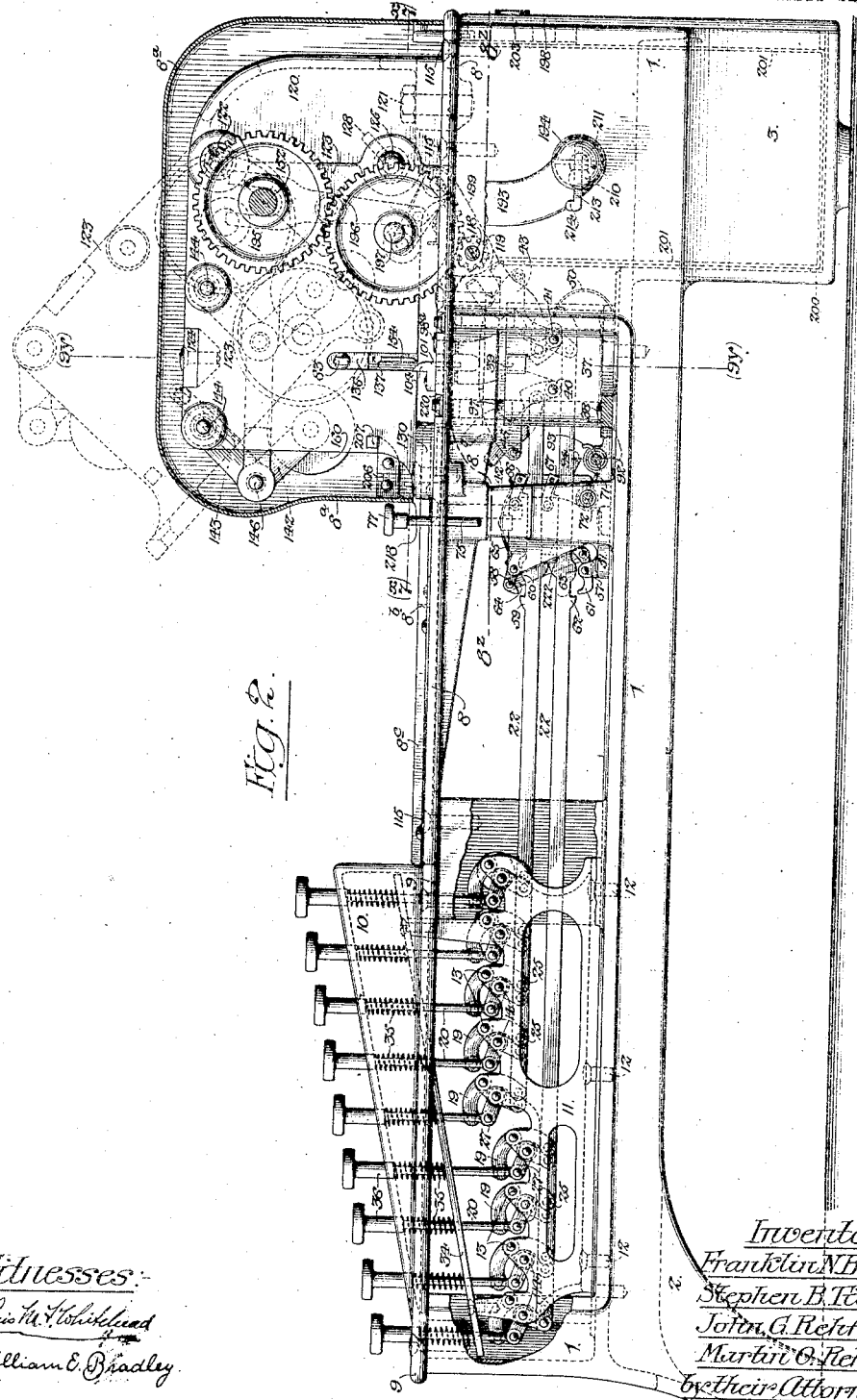

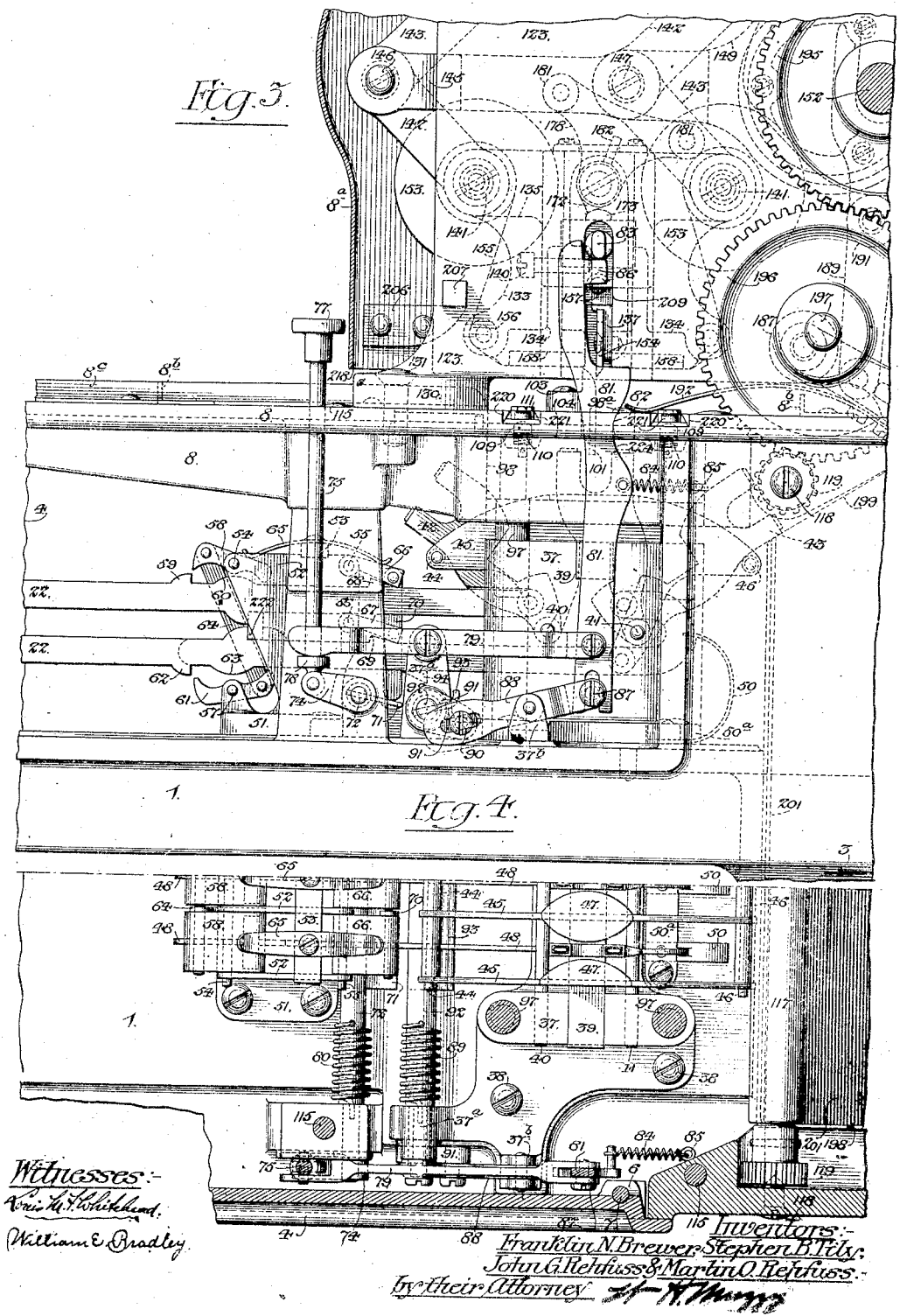

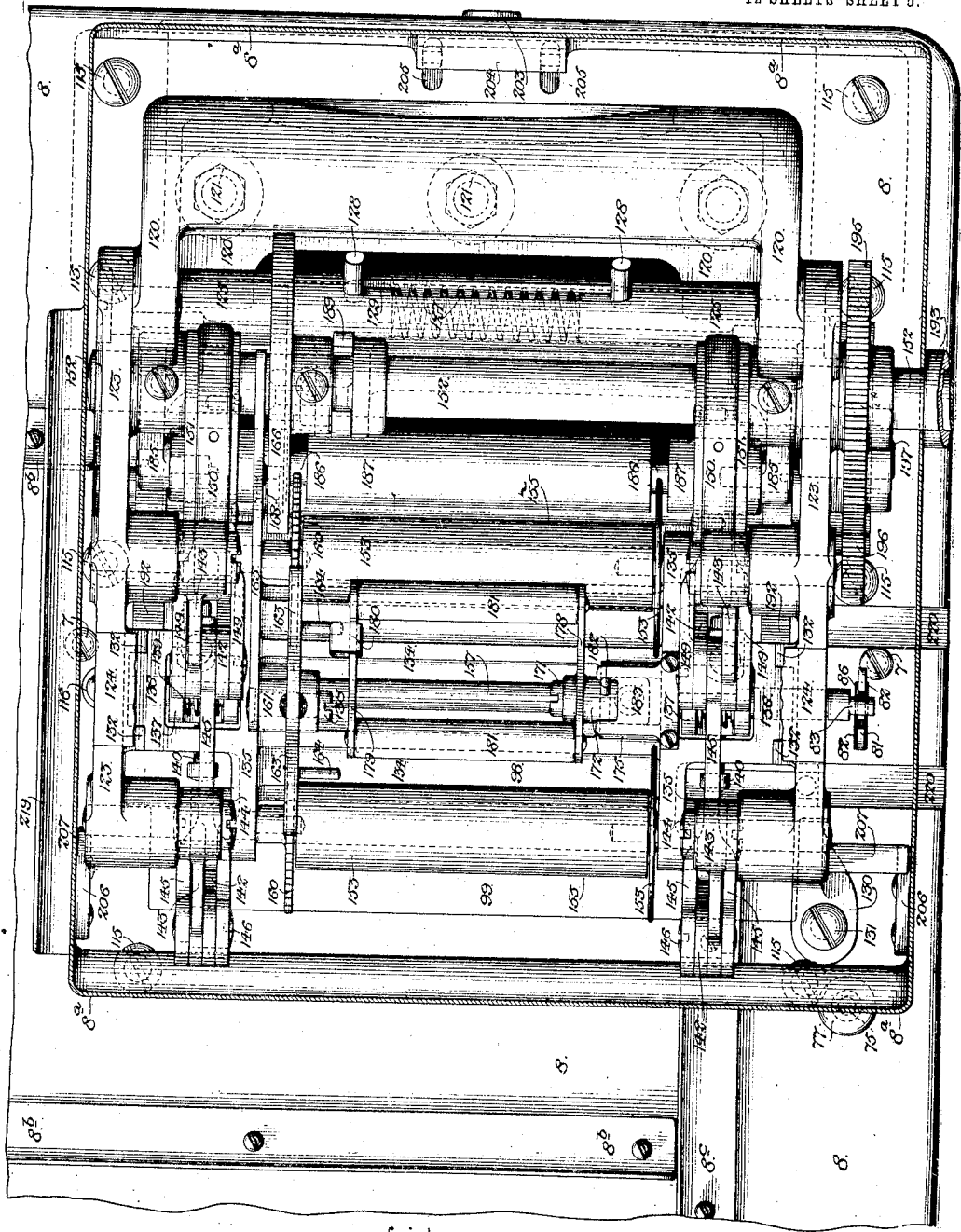

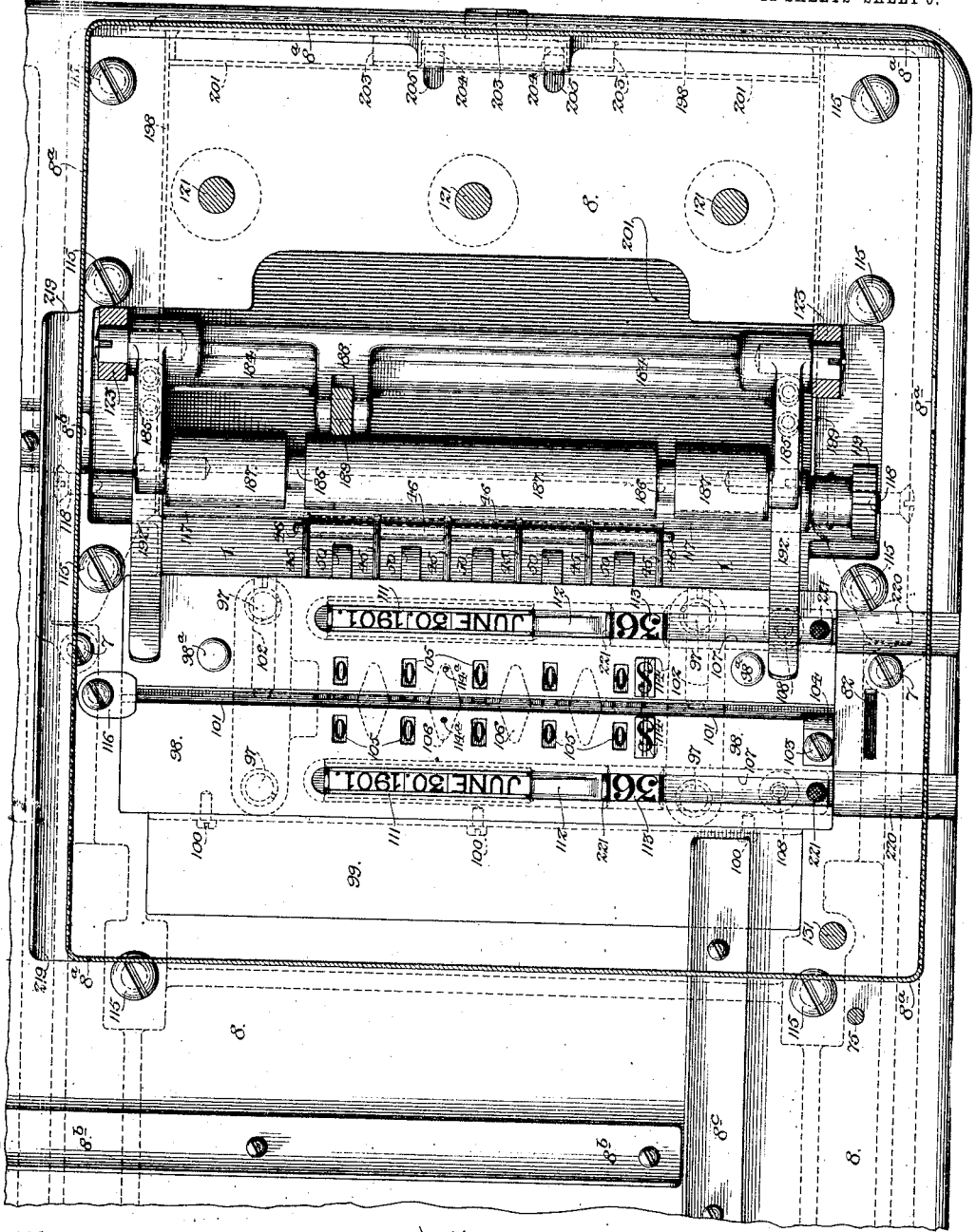

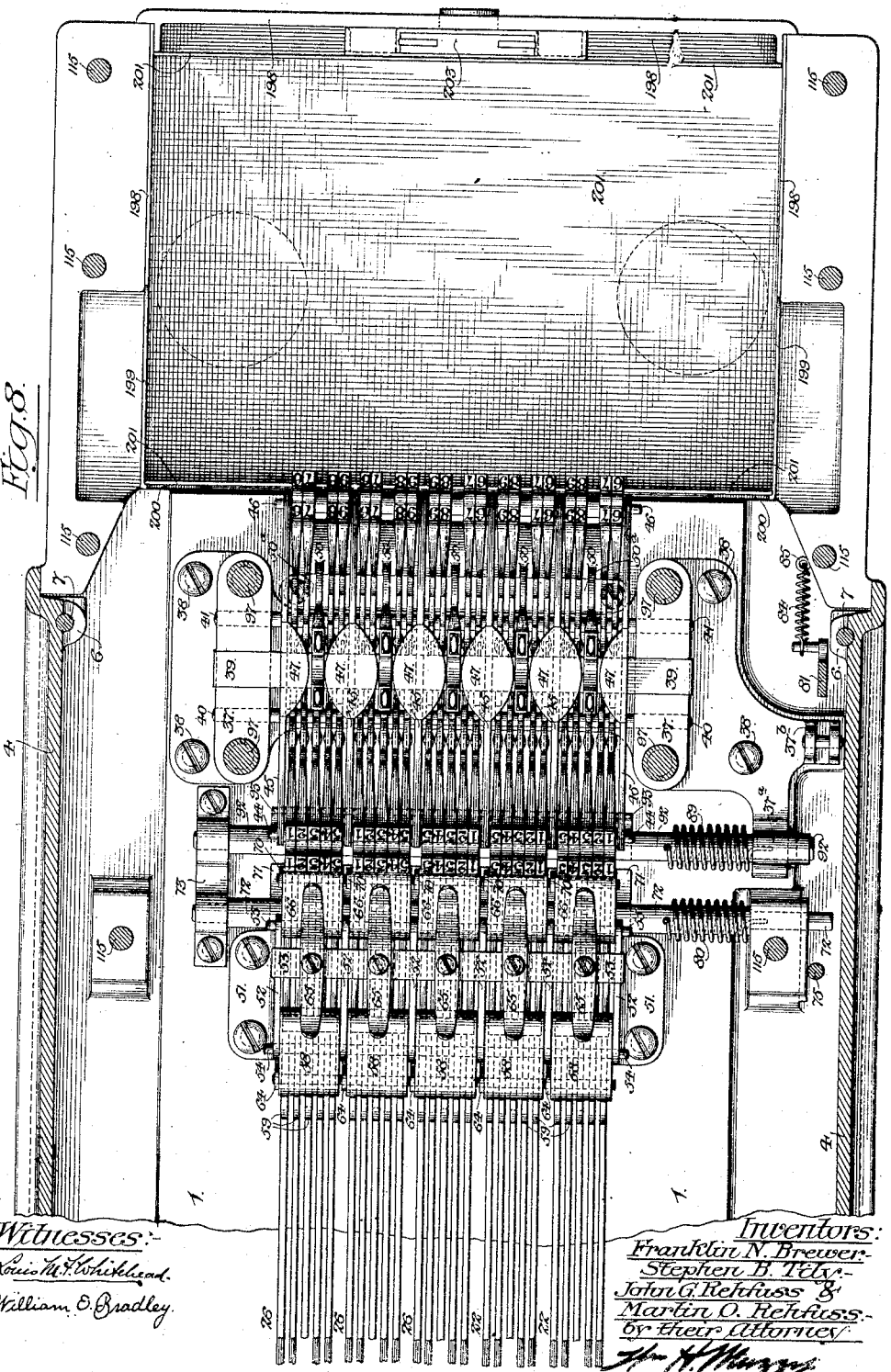

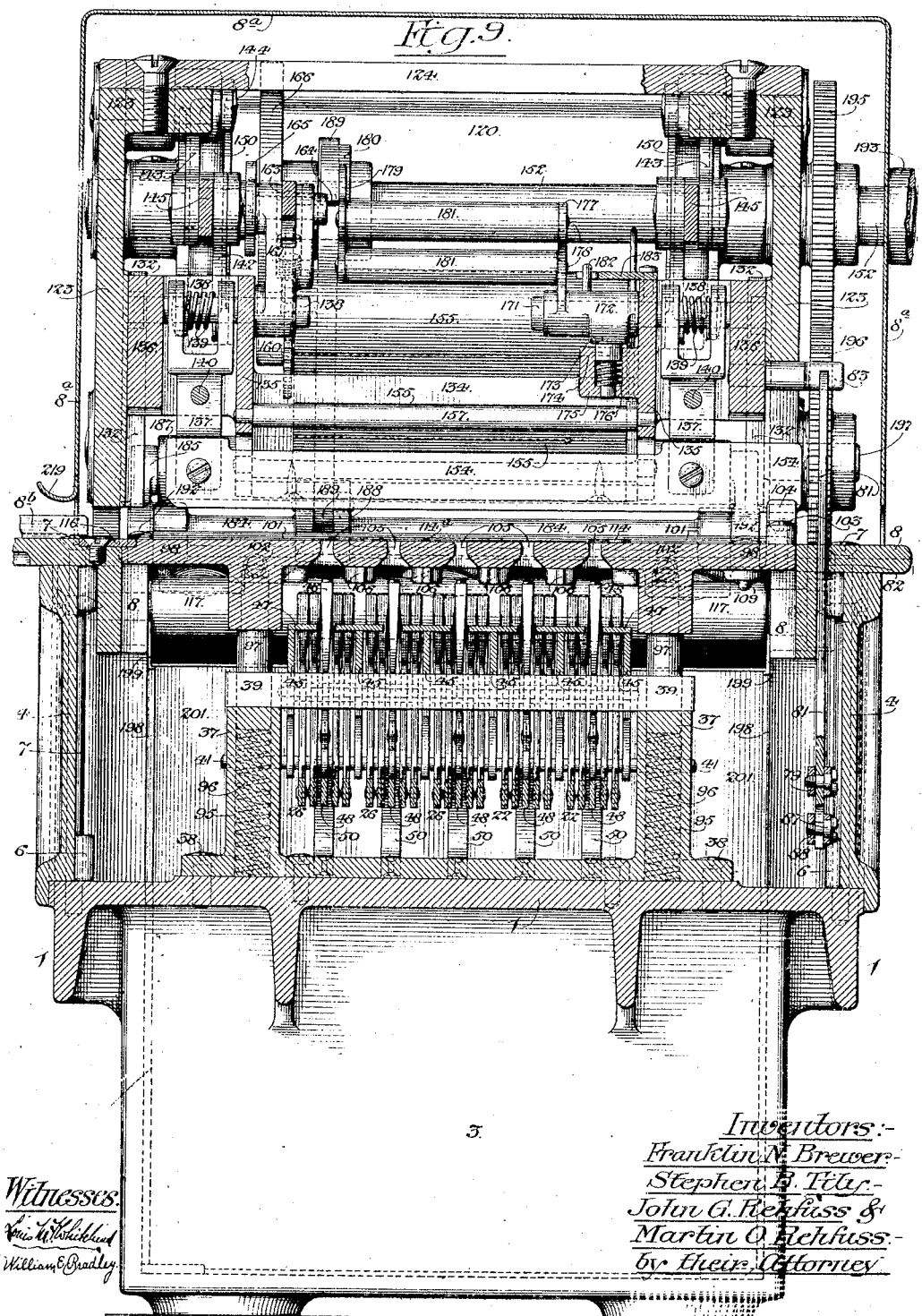

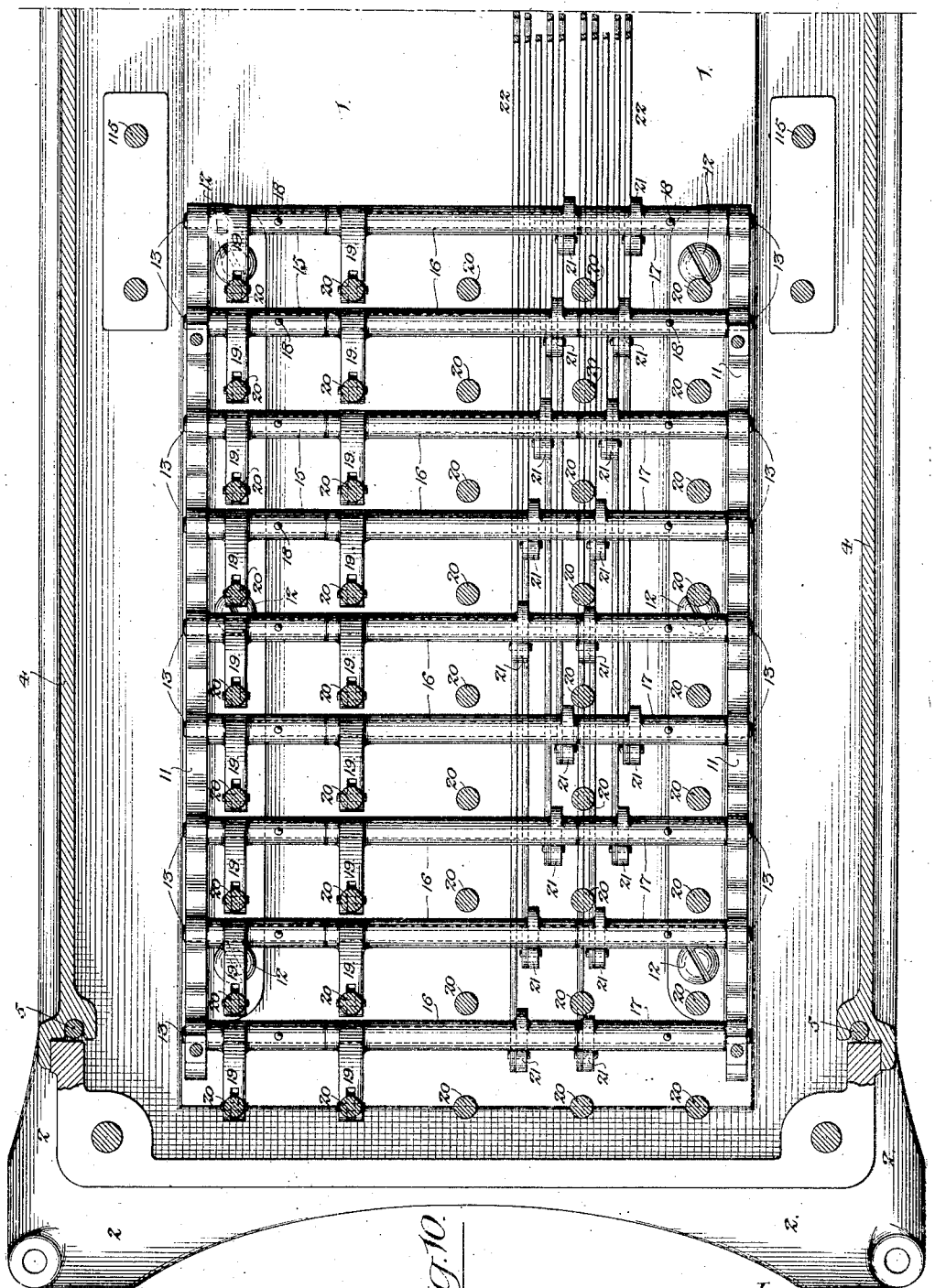

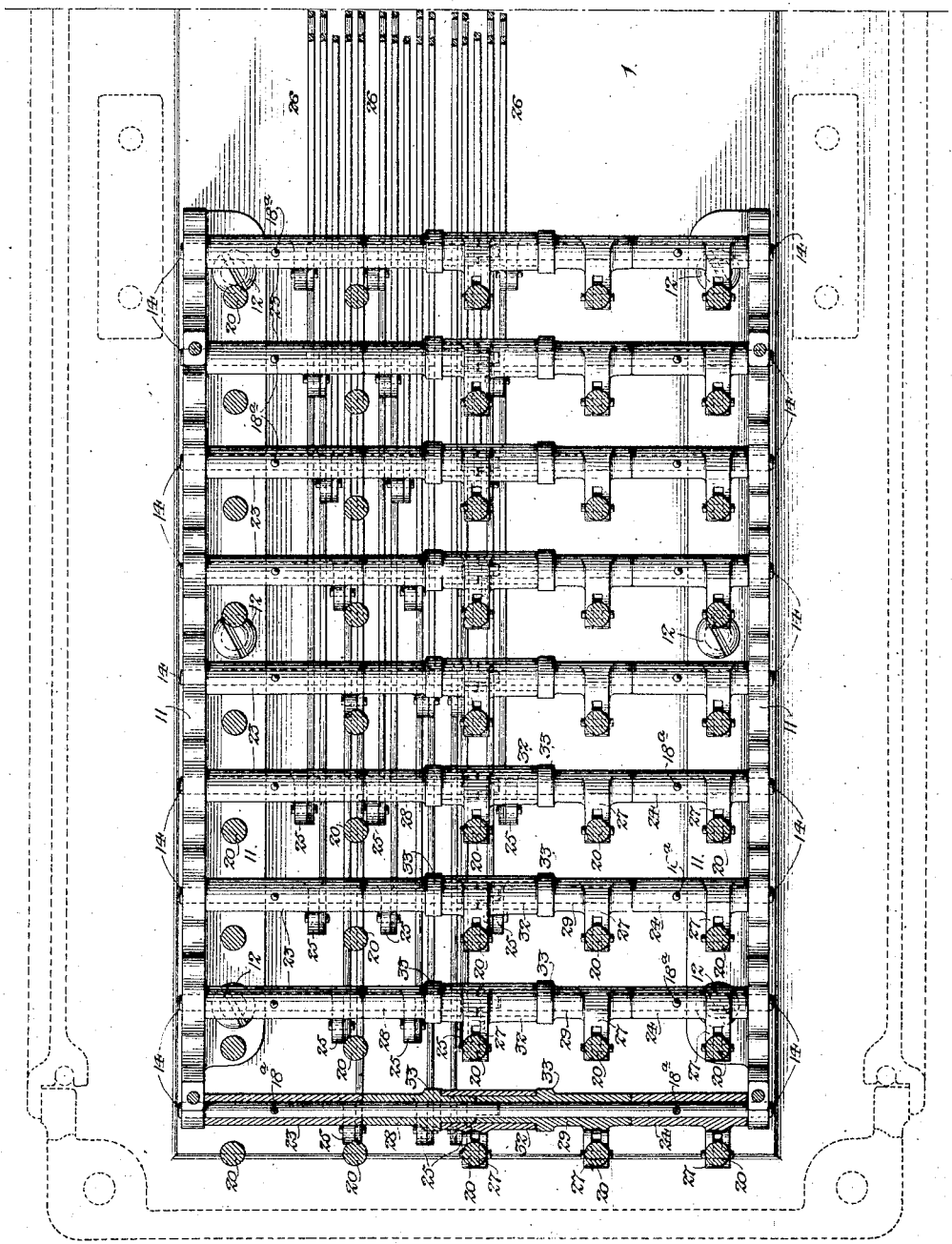

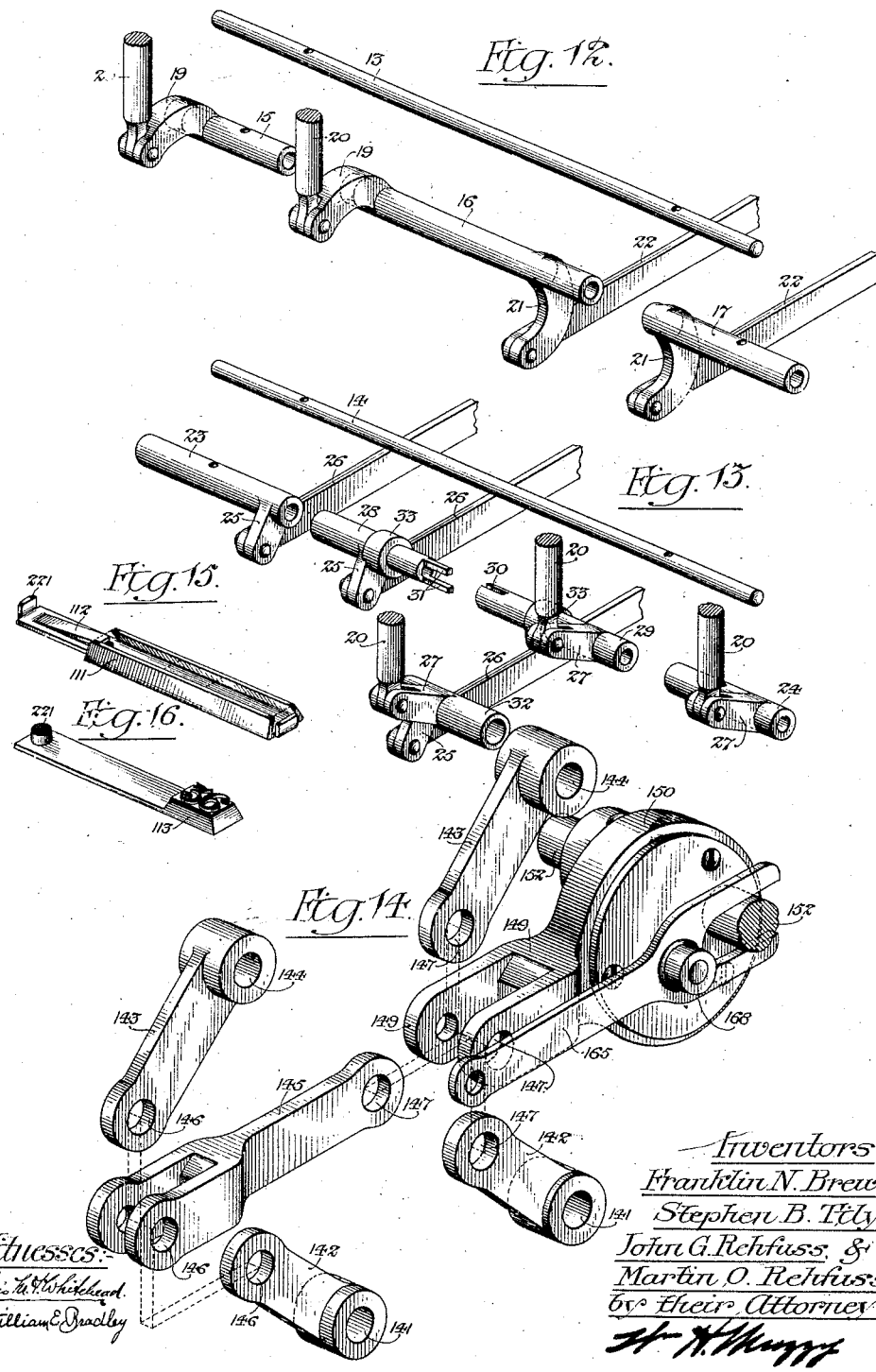

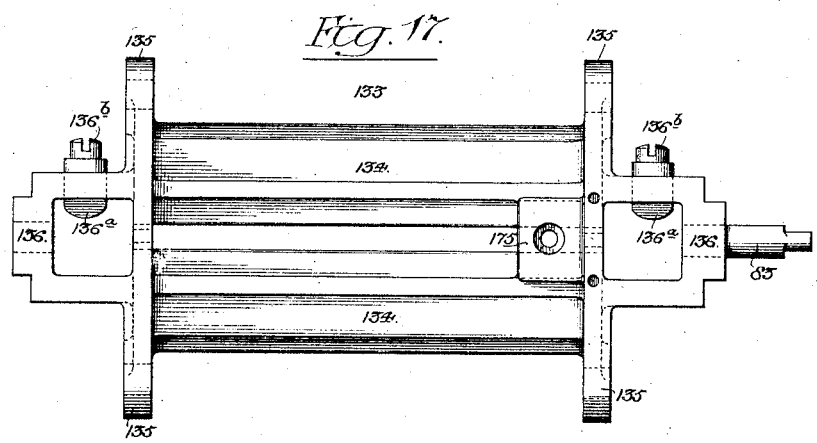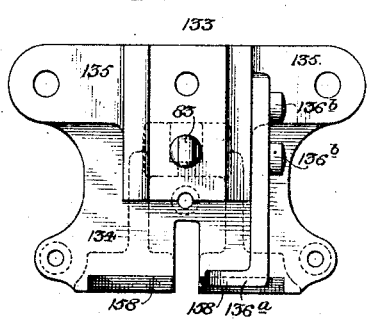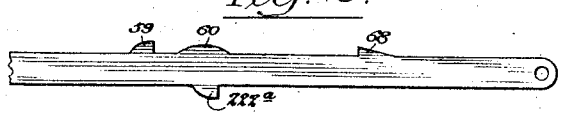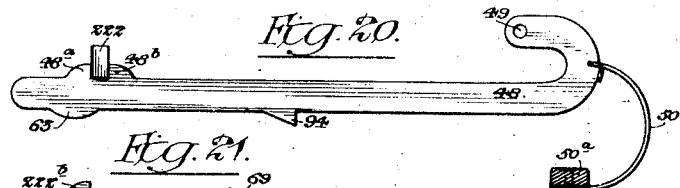

UNITED STATES PATENT OFFICE.

FRANKLIN N. BREWER, STEPHEN B. TILY, JOHN G. REHFUSS, AND MARTIN O. REHFUSS, OF PHILADELPHIA, PENNSYLVANIA, ASSIGNORS, BY MESNE ASSIGNMENTS, TO THE NATIONAL CASH REGISTER COMPANY, OF DAYTON, OHIO, A CORPORATION OF OHIO, (INCORPORATED IN 1906.)

SALES-RECORDING MACHINE.

1,045,118.  Specification of Letters Patent.  Patented Nov. 26, 1912.

Application filed June 21, 1902. Serial No. 112,574.

*To all whom it may concern:*

Be it known that we, FRANKLIN N. BREWER, STEPHEN B. TILY, JOHN G. REHFUSS, and MARTIN O. REHFUSS, citizens of the United States, and residents of Philadelphia, Pennsylvania, have invented certain Improvements in Sales-Recording Machines, of which the following is a specification.

This invention relates to improvements in recording or printing machines and has more particular relation to improvements in sales recording machines of the type covered by United States Letters Patent to Franklin N. Brewer, No. 565,133, dated August 4, 1896, and 584,573, date June 15, 1897.

The invention consists in certain novel constructions, combinations and arrangements of parts all of which will be hereinafter more particularly set forth in the claims.

In the accompanying drawings forming a part of this specification: Figure 1, is a plan view of our improved machine; Fig. 1ª, is a plan view, partly in section, of the operating handle 194, shown in Fig. 1; Fig. 2, is a side view of the machine partially in section, one of the side plates and the side of the top cover being removed; Fig. 3, is a side view on an enlarged scale of a portion of one end of the machine, showing the mechanism for controlling the operation of the type and for locking the type levers in position after the operating handle has been moved from its normal position; Fig. 4, is a plan view of the parts shown in Fig. 3; Fig. 5, is a vertical sectional view of the rear end of the machine taken on the line 5 v, Fig. 1; Fig. 6, is a plan view of the mechanism in the rear upper portion of the machine, the top cover being removed; Fig. 7, is a plan view of the rear portion of the machine taken on the line 7—x, Fig. 2. Fig. 8, is a plan view of the rear portion of the machine taken on the line 8—z, Fig. 2. Fig. 9, is a vertical sectional view of the rear portion of the machine taken on the line 9—y, Fig. 2. Fig. 10, is a sectional plan view of the front portion of the machine, showing the upper series of key shafts, and indicating the method of attachment of the key spindles and the type bars thereto. Fig. 11, is a sectional plan view of the front portion of the machine showing the upper series of key shafts and the arrangement of type bars and key spindles connected thereto. Fig. 12, is a detached perspective view of the parts carried upon one of the upper series of key shafts. Fig. 13, is a similar view of one of the parts carried upon one of the lower series of key shafts. Fig. 14, is a detached perspective view of the toggle mechanism and eccentric whereby the carriage carrying the inking ribbon and cutting off mechanism, is reciprocated. Fig. 15, is a perspective view of one of the receptacles for the removable type blocks. Fig. 16, is a perspective view of a form of removable type block used in connection with those ordinarily carried in the receptacle shown in Fig. 15. Fig. 17, is a plan view of the movable carriage upon which are carried one of the knife blades and the inking ribbon. Fig. 18, is an end elevation of the carriage shown in Fig. 17. Figs. 19, 20 and 21, are side elevations of portions of the upper, cipher, and lower type bars respectively showing the relative positions of the various projections upon the same. Fig. 22, is an elevation of the bar connecting the movable carriage with the pawl releasing mechanism of the type bars.

In machines of the type to which our invention belongs, it has hitherto been customary for the cashier or other person desiring to record a sale to assemble suitable type to express the amount of such sale in dollars and cents, by properly depressing certain keys of a bank of the same provided for that purpose. The sales slip upon which it was desired to record the amount of the sale, the date of the transaction, number of the cashier, etc., was then inserted through a suitable opening in the casing of the machine and an operating handle rotated, such action serving, by the aid of the mechanism of the apparatus, to cause the type previously assembled or set up to make an impression not only upon the sales slip but also to make a fac-simile impression upon a portion of a roll of paper contained within the machine, this latter being wound up by suitable mechanism after each record has been made upon it. A later improvement of this first machine, in addition to the above mechanism, was provided with means for severing a portion of the sales slip and depositing the same within a suitable receptacle in the machine, said severed portion having upon it the written record of the sale made by the sales person.

Our invention, in addition to the various improvements in detail construction over what has hitherto been known to the art, is provided with type having upon them characters made in duplicate; the interior mechanism of the machine being arranged so that when the operating handle is revolved after a sales slip has been properly inserted in the machine, a duplicate record of the amount of the sale, as expressed by the type assembled, is made upon said slip, after which a portion of the slip containing one of the records is severed from the main portion thereof and deposited within a drawer provided for that purpose.

Another object of our invention is to provide an improved means for locking the unoperated keys after the operating handle has been started.

By our invention, mechanism is provided by which, as soon as the operating handle is moved from its normal position, all of the type bars and their type are locked in position, being absolutely prevented from movement until the crank handle has again been returned to its normal position.

In addition to the features noted, the detail construction of the operating parts of the machine has been devised so that said parts will perfectly coact to secure the result desired, by the employment of a novel and at the same time simple construction which insures the greatest reliability and certainty of action.

The mechanism of our invention is contained within a box-like structure preferably formed in a single casting designated by the numeral 1, this being provided at one end with legs 2, and at the other with a downwardly extending portion 3. The two sides 4 of the box or casing proper are made removable, there being a vertical pin 5 at one end of each of the openings over which these side pieces fit and a corresponding recess in the ends of the pieces for the reception of said pins. The other ends of the side pieces 4 are provided with lugs 6 through which pass screws 7, the latter entering the main casting 1, and having their heads held in a top or cover plate 8 hereafter described.

The front portion of the apparatus is provided with banks of keys, each of said keys controlling a type block having two similar printing faces corresponding to the number or symbol marked upon the key. The said banks of keys project above a plate 9, this having an upwardly extending and forwardly inclined portion 10, whereby the keys farthest from the operator are elevated highest, the remainder of the keys as they approach the front of the machine being at uniformly lower levels. As shown in Fig. 1 these keys are arranged in five rows of nine keys each, the keys of the first row at the left being marked 100, 200, etc., to 900. Those of the second and fourth rows are marked 10, 20, etc., to 90, while those of the third and fifth rows bear the numerals 1, 2, etc., to 9. All of the type blocks are made with printing faces which print in duplicate the numerals 1, 2, 3, etc., to 9, the five sets or series of blocks being identical with each other.

It will be understood by those who are familiar with this class of apparatus that when in assembling the type blocks to make any desired record of a sale, the amount to be printed does not require a numeral in any particular column, none of the keys in the row of keys corresponding to that column is depressed, the result being that a cipher is printed in said column; the construction of the machine being such that type blocks bearing ciphers are always is operative or assembled position in alinement with type apertures in a movable chase to be described hereafter, unless said cipher type blocks have been replaced by others bearing numerals.

Within the box like casing 1 of the machine are two vertical frames 11, one on each side, both being held rigidly in position within said casing by means of screws 12, while extending between and connecting these frames are two series of spindles referred to hereafter as key shafts and numbered 13 and 14, it being noted that these are assembled in sets of two, one of the upper series 13 being preferably placed adjacent to one of the lower series 14.

From Figs. 10 and 12, it will be seen that upon each of the upper shafts 13 is a number of sleeves 15, 16, and 17, the outer ones 15 and 17 of each set being held to, and made to move with, its supporting shaft 13 by means of pins 18, the remaining sleeve 16 moving freely upon said shaft without being in any way connected thereto. Each of the sleeves 15 and 16 has upon it an upwardly and forwardly projecting arm 19, these arms being slotted at their ends and attached to the vertical key spindles 20 of the keys in the first and second rows of the bank upon the left side of the same.

The sleeves 16 and 17 have downwardly projecting arms 21, each of which is pinned to its particular one of a number of type bars 22 arranged parallel to one another on the extreme right of the machine. It will be noted that in order to occupy a minimum amount of space, these type bars are arranged in two planes, as clearly shown in Fig. 2, it being possible by such construction to greatly diminish the width of the machine.

From the arrangement of parts above noted, it will be seen that when one of the key spindles 20 is depressed, the corresponding sleeve 15, together with the shaft 13, to which it is pinned, is partially revolved, this also causing a partial revolution of the sleeve 17 also pinned to the shaft 13 and consequently imparting longitudinal motion to one of the type bars 22 attached thereto.

The lower series of key shafts is shown in Fig. 11, and it will be seen in the detached perspective view illustrated in Fig. 13, that to the shaft 14 there are held two sleeves 23 and 24 by pins 18ª, the first of these sleeves having a downwardly projecting arm 25 rigidly attached to one of a second set of type bars 26, while the second sleeve 24 has an upwardly projecting arm 27 pinned to the key spindle 20. Between these two sleeves 23 and 24 upon the shaft 14, are two other sleeves 28 and 29, one of these having a slot 30 and the other being provided with a projecting portion 31 for engaging said slot 30 whereby they are operatively coupled together while being made in a form which permits of the assembling upon them of a fifth sleeve 32.

It will be seen that each of the sleeves 28 and 29 has a collar 33, and these it is which keep in place the sleeve 32 which is made so as to freely turn upon the interlocked ends of the said sleeves 28 and 29, these being also free to turn upon and independent of the shaft 14.

Both the sleeves 28 and 32 have downwardly projecting arms 25, while the sleeves 29 and 32 are provided with upwardly projecting arms 27, these latter, with the upwardly projecting arm of the sleeve 24 being pinned respectively to a key spindle in each of the three series of the same on the right side of the bank of keys, while the downwardly projecting arms of the sleeves 28 and 32, together with the similarly placed arm of the sleeve 23 are pinned respectively to one in each of the three series of type bars 26 on the left side of the machine.

It will be noted that the upper series of key shafts 13 carry the sleeves necessary for the operation of but two rows of the keys in the bank of keys while the lower series of shafts 14 carry the sleeves for the operation of the remaining three rows of keys.

Held by means of screws to projecting portions of the side frames 11, is a plate 34, preferably inclined so as to be parallel to the inclined portion 10 of the plate 9. All of the key spindles 20 pass through this second plate, and there is a spring 35 upon each of said spindles confined between said plate and the upper enlarged portion 36 of the spindle to which the key proper is attached. These springs always tend to retain the keys in their elevated position, and are sufficiently strong to return the type bar with its particular key spindle to the normal position after one of the keys has been depressed.

In the specific embodiment of the printing mechanism which is about to be described, there is shown a plurality of type blocks, each having duplicate characters thereon against which a frame carrying two platens is constructed to be depressed to take duplicate impressions from said type carriers upon a suitable record material. This platen carrying frame is also provided with a knife between said platens which is arranged to sever the record material so that a portion of said material may be retained in the machine while the other portion may be withdrawn therefrom. This construction is shown merely as an illustrative form for accomplishing this purpose and it is to be understood that this invention is not limited to this particular form, but also includes type carriers having a single set of characters thereon from which duplicate impressions may be taken, and with mechanism for also severing the record strip between the duplicate impressions and retaining one of said severed portions in the machine.

Passing now to the rear portion of the machine and considering the operating mechanism therein contained, it will be seen from Fig. 8, that there are two blocks or standards 37 held to the inside of the bottom of the main casing or box 1 by screws 38, and having a bar 39, preferably of rectangular section, and two shafts 40 and 41 of circular section, extending between them. Upon these shafts are pivoted respectively two sets of type blocks 42 and 43, each of these sets consisting of five similar series of blocks as shown in Fig. 8.

The set of type blocks indicated by the numeral 42 in Fig. 5, are pivoted to the shaft 40 in front of the rectangular bar 39 and lie normally at an angle to the perpendicular, resting against a bar 44 extending the length of said sets of type blocks and which is carried by vertically placed plates 45 secured to the bar 39. A similar limiting bar 46 extends through the rear ends of the plates 45, preventing undue motion of the rearwardly inclined set of type blocks 43. It will be noted that one of the plates 45 extends between each one of the five complete sets of type blocks, which are constructed as shown in Fig. 8, with duplicate printing faces engraved with figures from 0 to 9 inclusive.

From Fig. 5 it will be seen that the two shafts 40 and 41 are at a level midway between the upper and lower layers of type bars and that the forwardly, inclined or front set of type blocks 42 are pivoted to the upper of said layers of type bars, while the rear sets of type blocks 43 have arms projecting below their point of attachment to the shaft 41 and are pivoted to the lower layer of said type bars.

As in the two patents to Brewer previously referred to, the type blocks 42 and 43 are made with indentations shaped to fit squarely upon the bar 39 when said blocks are moved upon their pivoted shafts into a vertical or assembled position, all of the ten blocks of one set being guided to a position in a single vertical plane by means of elliptical, horizontally placed plates 47 preferably formed integral with the vertically placed dividing plates 45.

The type blocks are made U-shaped at their upper ends and provided with similar characters upon each arm of said ends. It will be seen that there are nine type bars in each set extending forwardly to each row of keys, each of these bars being connected to and controlling one of the type blocks having upon it any one of the numerals included between 1 and 9. There is in addition a type block in each of the five sets having upon it the character "O", and in Fig. 20, is shown the type bar by which this type block is operated. These zero type bars 48 extend in the plane of the lower layer of the type bars, being made with their ends hooked or turned back as shown, so that said ends may be pivoted to the zero type blocks as at 49, in substantially the level of the upper layer of type bars. There are springs 50 held to the main casing in any suitable manner preferably by a single bar 50ª fixed in position by screws, which constantly act against the rear portion of the bars 48 and always tend to force them forward.

Just in front of the series of type blocks is placed the mechanism for retaining any one of said blocks of each set in an elevated or assembled position and the corresponding key in its depressed position, together with the resetting mechanism and the means for preventing motion of any of the keys after the operating arm hereafter to be described has been moved from its normal position. The mechanism comprising these parts is carried on a horizontally placed plate 51 extending across the bottom of the interior of the casing proper of the machine and under the type bars, there being six parallel and vertically placed plates 52, carried by this plate, extending between and on the sides of the five sets of type bars. These plates are connected at the top by a bar 53, in addition to which there are four pivotal shafts or spindles 54, 55, 56, and 57, extending through and between said plates.

Pivotally carried on the shaft 54 are five pawl plates 58 placed so as to engage projections 59 and 60 on the upper set of type bars, there being a similar set of five pawl plates 61 carried by the shaft 57 and placed to engage projections 62 and 63 on the under side of the lower layer of type bars. Bars 64 connect the upper pawl plates 58 with the lower pawl plates 61 immediately under it, the result of such connection being that whenever from any cause one of the plates approaches the set of type bars adjacent to it, its corresponding lower plate similarly approaches the set of type bars adjacent to it. Springs 65 are carried on the bar 53 and rest upon the plates 58, keeping the front portions thereof in a normally elevated position and through the lever 64, similarly retaining the front portions of the plates 61 out of engagement with the projections 62 on the lower type bars. There is a second set of pawl plates 66 and 67 carried respectively by the shafts 55, and 56, and placed so as to engage at certain times projections 68 and 69 upon the upper and lower sets of type bars. There are five pairs of these pawl plates, the members of each pair being connected to each other by a lever or bar 70. All of the bars 70 are extended below the plates 67 so as to rest upon a relatively long flat plate 71 rigidly fixed to a shaft 72, which has coiled upon it a spring 80 tending to keep the plate in an elevated position and against the said bars. This shaft with the said plate extends completely across the casing of the machine under the type bars and is supported at one end in a block 73 fastened to the bottom of the casing, while at the other end it extends through and projects beyond a vertical standard preferably formed integral with the frame. On this projecting end of the said shaft is fixed a slotted arm 74 constructed to receive a vertical rod 75 extending through the cover plate 8 of the machine and provided at its upper end with a key 77 whereby it may be manipulated. There is a flange or collar 78 near the lower end of this rod or spindle 75, upon which rests the forked end of a lever 79 pivotally supported upon an upwardly projecting lug 37ª formed integral with one of the standards 37 above mentioned. The other end of this lever is forked, being pinned to a vertical bar 81 which extends through a slot 82 in the cover plate 8 and which is in engagement with a stud 83 projecting from a movable carriage to be described hereafter.

The bar 81 is normally held in engagement with one end of the slot 82 by means of a spring 84 attached to a pin 85 upon a fixed portion of the casing, the portion of said bar adjacent to the cover plate being curved to form a cam and thereby causing backward and forward motion of the bar whenever said bar is moved up or down.

The upper end of the bar is offset as shown in Figs. 3 and 22, and is provided with a horizontally projecting portion 86 placed so as to engage the stud 83 above referred to. The forked lower end of this bar 81 is in engagement with a pin 87 in one end of a lever 88 pivoted to a lug 37ᵇ also formed integral with one of the standards 37 before mentioned. The second end of this lever is slotted as shown in Fig. 3, being in engagement with a pin 90 projecting from an arm 91 on a shaft 92 extending completely across the casing under the type bars. Similarly to the shaft 72 it is supported at its far end in a bearing in the block 73, its forward end passing through the lug 37ᵃ.

An upwardly turned plate 93 fixed to the shaft 92 extends with it under the type bars, being so placed as to come in engagement with projections 94 on the under side of the zero operating type bars 48 when said shaft is revolved, although said plate is normally retained in a depressed position by a spring 89 wound on the shaft 92. The said spring has one end fastened to the lug 37ᵃ and the other in engagement with the shaft 92. The five zero type bars are also each provided with two projections 48ᵃ and 48ᵇ (see Fig. 20) between which extends a bar 222 running at right angles to the bars and of a length reaching to the outermost of the numeral type bars of the set to which it belongs. There are on each of the type bars of the upper layer downwardly extending projections 222ᵃ and upon each of the type bars of the lower layer upward projections 222ᵇ, which normally are in engagement with the cross bar 222 of their particular set, the result of such construction being that rearward motion of any numeral type bar causes corresponding rearward motion of the zero type bar belonging to its set.

The standards or blocks 37 serving as a support for the shafts 40 and 41 upon which the type blocks are pivoted, have in their top faces holes or depressions 95 best shown in Figs. 5 and 9. There are in these holes, springs 96 designed to press against the downwardly projecting plungers 97 belonging to and carrying a movable chase 98. This latter consists in the present instance of a rectangular plate shown in Figs. 5, 7 and 9 having a forwardly extending portion 99 fixed to its forward edge by means of screws 100. A slot extends the whole length of the plate and in this is held a knife blade 101 by means of set screws 102 extending horizontally through relatively thickened portions of the plate proper.

At one end of the upper side of the plate and held in position by a screw 103, is a guide piece 104 which projects just above and almost in line with the cutting edge of the knife blade. The portion of this guide piece adjacent to the blade is inclined toward the same and serves to prevent the possibility of the upper knife blade, to be described hereafter coming into direct contact with the edge of the blade 101. Owing to the possibility of lateral movement by the said upper knife blade this guide piece insures its shearing past the cutting edge of the lower blade without liability of striking it directly upon said edge.

There are on each side of the knife blade 101 two sets or series of apertures 105 extending through the chase 98, the apertures of each series being formed in a line parallel to said blade, and from Fig. 9, it will be seen that these apertures, while being practically rectangular in section and of relatively small size at the surface of the chase, widen and flare out as they pass through the body of the plate, the construction being such that there are between each pair of openings, diamond shaped guiding lugs 106 formed with their long axes at right angles to the knife blade. In the assembled machine it will be noted that the apertures 105 are directly over the zero type blocks, which under normal conditions are in a vertical or assembled position and rest upon the supporting bar 39.

There is an undercut slot 107 on each side of and formed parallel with, the knife blade 101, and these slots extend to one end of the chase plate, near which point they are provided with spring stops 108. These stops, as shown in Fig. 3, consist of plungers 109 acting in suitable cavities in the body of the chase plate which are normally held in an elevated position by springs 110.

Fitting into the under cut slots 107 are removable type receptacles 111 of the form shown in Fig. 15 and it will be seen that their interiors are made trapezoidal in section so as to receive and retain similarly shaped type blocks, which in the present instance have characters to indicate any desired month and day of the year. The type blocks are retaned in place by means of projecting spring tongues 112 struck up at the ends of the receptacles 111, the said tongues being made so that they may be depressed to allow of the removal of the type blocks when it is desired to change the same. In addition to these receptacles, there are also, in the present instance, removable type blocks 113 having on them characters indicating the distinguishing number of the machine and provided with an extended portion made with an upwardly projecting portion 221. These blocks with their extended portions are of such a length that they just fill the space to the left of and the type receptacles 111. The plungers 108 project into suitable sockets formed in the bottoms of the extensions 221. There are a pair of fixed type 114 adjacent to the endmost pair of the apertures 105, bearing the character of the dollar mark, as well as a pair of type 114ª between one pair of said apertures to indicate decimal points.

As illustrated in the drawings, the upper surface of the movable chase is flush with and replaces a cut away section of, the cover plate 8 which extends over the entire rear half of the machine. This plate is preferably constructed to project over one side of the machine and beyond the plane thereof, having upon it guides 8ᵇ and 8ᶜ wherewith to regulate the position of a sales slip as it is being inserted in the machine, as hereinafter set forth. The rearmost guide 8ᵇ, and the guide 8ᶜ extend from the cover 8ª to the side and to the front edge respectively, of the plate 8, while the second guide 8ᵇ extends from the guide 8ᶜ parallel to the first guide 8ᵇ to one side of the plate 8. All of said guides are held in place by suitable screws.

It will be observed, that when the movable chase 98 is pressed downward, the plungers 97 compress their respective springs until the under portions of the chase to which said plungers are fixed come in contact with the upper surface of the standards 37, thus preventing further motion. When the chase has reached this point, any type blocks which may be supported in a vertical or assembled position upon the bar 39, will project through the apertures 105, their printing faces extending just above the surface of the top of the chase.

As shown in Fig. 7, the upward motion of the movable chase is limited, and the same prevented from coming above the surface of the cover 8, by means of a stop 116, which consists of a small plate countersunk level with the upper surface of the cover plate 8, and projecting into a corresponding recess in the movable chase. In addition to this, the guide strip 8ᶜ fastened to the upper surface of the cover plate 8 also extends over the end of the chase 98 opposite to that having the stop 116.

The cover plate 8 is cut away, back of the movable chase to form a rectangular opening, across which a roller 117 extends at the level assumed by the upper surface of the movable chase at its lowest limit of motion. The said roller is supported upon pins 118 projecting inwardly from the sides of the casing proper of the machine, and is provided at one end with a small pinion 119, by which it is turned as hereafter described.

Passing now to the printing and cutting off mechanism, it will be seen that there is a vertical frame 120 held to the rear end of the cover plate 8 by means of bolts 121, there being a movable framework pivoted to the upper portion of this fixed frame by trunnions 122, shown in dotted lines in Fig. 5. The movable framework consists of two side plates 123 rigidly connected by a cross bar 124, these plates extending outside of the forwardly projecting portions of the frame 120 to which they are pivoted.

Under normal conditions, the movable framework above described is held rigidly in a fixed position by means of spring controlled plungers 125, operating in a tube extending across the lower part of the frame 120, and projecting through openings in the side plate 123 when the movable frame of which they form a part is resting on the plate 8, it being noted that they are forced outwardly by means of springs 127 within the tube 126. There are pins 128 upon the plungers 125 projecting through slots 129 in said tube, whereby it is possible to draw the plungers inwardly out of engagement with the plates 123 of the movable framework, so as to leave this latter free to be rotated upon the trunnions 122, whenever it is desired to inspect the under or lower portion of the mechanism carried by said framework. One of said plates 123 of the movable framework is provided with a foot 130 so placed that it rests upon the surface of the cover 8 when the plungers 125 are in engagement with and projected into their respective side plates, there being a screw 131 passing through the foot and entering the plate 8, by which the framework is rigidly held to said plate.

Opposite one another upon the inner faces of the side plates 123 of the movable framework, are ribs 132 forming guides for a vertically movable carriage 133. This carriage primarily consists of a casting which may be described as composed of two T-shaped pieces 134 joined at their ends by plates 135, from which project hollow rectangular portions 136 constructed to slide upon the guides 132.

Between the pieces 134 extends the upper knife blade 154, which is carried by downwardly projecting arms 137 hung from shafts 138 extending across the hollow interior of the guide sections 136. Each of the said shafts is provided with a spring 139, fastened at one end to the arm 137 and at the other to the part 136, which constantly tends to revolve its arm 137 around the shaft 138, this action of the two springs tending to press the knife blade 154 against one of the T-shaped pieces 134. The distance of the knife blade from these pieces is, however, regulated by means of set screws 140, shown in dotted lines in Fig. 5, and in section in Fig. 9, these screws passing through the guide sections 136 and bearing against the arms 137.

There are upon the upper surface of the movable chase 98, two studs or projections 98ª, and immediately above these on the carriage 133, are two adjustable presser plates or feet 136ª, as clearly shown in Figs. 17 and 18. Each of these presser feet is L- shaped, having one arm extending up along the outside of a guide section 136, to which it is held by screws 136ᵇ; the said arm being slotted to permit of adjustment when the screws are loosened.

The carriage 133 is normally held in its elevated position by four sets of toggle arms, two on each side, which are held to the end portions of said carriage by screws 141. Each toggle consists of bars 142 and 143 pivoted together as shown, and at their upper ends pivoted to the end plates 123 of the movable framework by means of screws 144.

A connecting rod 145 on each side of the machine is pivoted by a screw 146 to the front pair of toggles on each side of the machine at the point of junction of the bars 142 and 143, these rods being similarly connected by a screw 147 at the point of junction of the bars comprising the rear pairs of toggles. Also connected to the mechanism at this latter point is the forked end of an eccentric rod 149, having formed integral with it an eccentric strap 150 which is fitted to an eccentric or cam 151 fixed to the main shaft 152. It is to be understood that there is one of these eccentrics with its strap and rod at each side of the machine as indicated above and as shown in Figs. 6 and 9.

Extending between the end plates of the carriage 133 are two rollers 153 upon which is wound the inking ribbon 155 for the type. This ribbon is guided by means of rollers 156 and 157 also extending between the end plates of the carriage, the latter of these rollers being placed above the knife 154 as best seen in Fig. 5. The ribbon passes from one of the rollers 153, down around one of the rollers 156, over the lower face of one of the T-shaped pieces 134 and then passes up and over the roller 157, down and across the lower face of the second piece 134 over the second roller 156 to the second ribbon roller 153.

We preferably set pieces 158 of relatively soft material, as hard rubber, into the lower faces of the pieces 134, holding them in place by means of screws as indicated in dotted lines in the drawings, thereby preventing injury to the type or to the ribbon from contact with what would otherwise be hard and unyielding surfaces; it being noted that the ribbon will not be cut by the sharp metallic faces of the type when these are pressed against it by the action of the carriage 133.

Upon each of the ribbon rollers 153 and at the same end of each, are toothed ratchet wheels 160 through which motion is transmitted to said rollers. The mechanism for operating the rollers consists of a forked piece 161 pivotally held by the pin 138 (before referred to as supporting one of the knife block arms 137), to one of the side plates 135 of the carriage 133. Between the forks of said piece is loosely carried a double ended pawl 163, having lateral pins or bars 164 projecting from each of its said ends and at right angles to the same. This pawl is placed in the vertical plane in which are the ratchet wheels 160 and there is a connecting rod 165 pivotally attached at one end to the piece 161 made with its other end forked and supported by the main shaft 152. Upon said shaft and adjacent to the above mentioned forked end of the bar 165, is a cam 166 made with a groove 167 in its face next to the said rod, for the reception of a pin 168 projecting from the latter.

At the bottom of the space between the forks of the piece 161 is a plunger 169 constantly pressed upward by a small spiral spring 170, it being seen from Fig. 5, that the under side of the central portion of the pawl 163 is somewhat pointed and extends downwardly below its pivot far enough to be engaged by the said plunger when the pawl is turned on its pivot. In oscillating the pawl, this lower pointed portion forces the plunger downwardly against the spring 170 until said pawl has turned far enough to bring its point to the other side of a line extending between the pivotal point of the pawl and the center of the plunger. After this point has been passed the pawl is moved under the action of the plunger, which presses against one side of the pointed portion until the end of the pawl adjacent to said side comes in contact with its ratchet wheel 160.

Projecting from the side plate 135 of the carriage opposite to the one supporting the pawl mechanism above described, (see Fig. 9) is a pin or shaft 171 which may for all practical purposes be considered an extension of the spindle or pin 138 supporting one end of the upper knife blade 154. Upon this spindle is carried a sleeve 172 having a cam-like portion 173 projecting from a portion of the lower half of its surface into contact with a plunger 174 which operates within a recess formed in a projection 175 from the side plate 135 of the carriage 133, said plunger being continually forced upward by a spring 176. This cam-like portion 173, like the pointed central portion of the double ended pawl 163, is acted upon by its plunger, so that the sleeve 172 is kept in either one or the other of its two extreme positions and moves suddenly under such action to one of said positions after it has passed what may be referred to as the dead point, as described in connection with the pawl 163. Extending upwardly from one end of the sleeve 172, is a preferably triangular plate 177 (Fig. 9) and dotted lines in Fig. 3 supporting shafts 178 in the two uppermost of its angular corners. These shafts extend horizontally and are connected at their other ends by means of a second triangular plate 179 (Fig. 5) placed so that two of its corners receive the said shafts and the third projects upwardly and carries a laterally extending lug 180 so placed as to strike the pins 164 on the double ended pawl under certain conditions of operation.

Rollers 181 are carried upon the shafts 178 and one of these normally bears upon the roll of inking ribbon 155 on one of the rollers 153. The motion of the sleeve 172 and consequently that of the rollers 181 is further limited by a pin 182, Fig. 9 fixed in said sleeve and projecting through a slot in a plate 183 fixed to the top of one of the side plates 135 in the movable carriage.

Extending between the lower rear portions of the side plates 123 of the upper framework which carries the inking and cutting off mechanism above described, (see Fig. 5) is a pivotally supported bar 184 having an arm 185 projecting from it near each end, which supports a shaft 186 provided with a covering of rubber 187. In addition to the above, there is a second arm 188 extending from the bar 184, to which is pivotally connected a forked bar 189, whose upper end engages and extends around the shaft 152 as shown in Fig. 5. Supported upon a pin 190 and extending at right angles to this bar is a roller 191 placed so as to be engaged by the periphery of the cam 166, the action of said cam upon the roller being such that when the former is revolved, the said roller, with the bar 189, is pressed downwardly, causing a partial revolution of the shaft 184 and a corresponding downward motion of the rubber covered roller 186. The roller is normally maintained in its raised position and the roller 191 is retained in contact with the periphery of the cam 166 by means of flat springs 192 which are connected to the projecting arms 185 and extend forward and downward near each side of the machine so as to rest upon the upper plate of the movable chase 98.

As shown in Figs. 6 and 9, the main operating shaft 152 projects beyond the side plate 123 of the upper framework of the machine and has fixed to its end an operating arm 193 provided with a handle 194 as shown in Fig. 1. It will be noted that the cover 8ª which incloses the mechanism for operating the inking ribbon, cutting off knife, etc., extends between the frame supporting said mechanism and the operating arm 193, the said cover being slotted so that it may easily be put over or removed from this upper part of the machine.

Fixed to the operating shaft 152 just outside of the side frame 123, but within the cover 82, is a gear wheel 195 meshing with a second gear 196 supported on a spindle 197 which projects from the side plate 123. This second gear is so placed and of such dimensions that it extends below the level of the cover plate 8 which is slotted to admit it. Placed in such a position as to engage the teeth of the gear wheel 196, is the pinion 119 (Fig. 3) carried on the roller shaft 117 supported on pins 118 projecting inwardly from the sides of the casing of the machine.

As shown in the various figures of the drawings, the rear portion of the casing of the machine proper projects downwardly, forming a rectangular inclosure 3 entirely open on its rear face and having fitted into it a box-like casting 198, which, however, is constructed without front or top. The upper forward corners of the two sides are cut off at an angle as indicated at 199 in Fig. 5, in order to avoid contact with the roller 117, while the two sides of its bottom front edge have upwardly turned portions 200 for the purpose of retaining in position an open, U-shaped receptacle 201 designed to fit within the box. Upon the inner surface of the rear face of the box 198 are lugs 202 to which is fastened any desired lock mechanism 203, so placed as to engage a hasp or other equivalent construction 204 fastened to the cover 8ª whereby the latter may be retained in position.

It will be noted from Fig. 5, that the downwardly projecting hasps 204 from the cover 8ª pass through elongated slots 205 in the main cover plate 8 of the machine, the object of this being to allow of the rearward motion of the said cover 8ª after it has been put in place over the mechanism which it is designed to protect. For the purpose of making it impossible to remove the said cover by other means than proper operating of the lock mechanism 203, small pieces or lugs 206 are fastened to the inner front portions of the said cover, as indicated in Fig. 6, and there are projecting from the side plates 123, studs or bars 207, which allow the lugs 206 to freely pass them when the cover 8ª is put in position. When, however, the cover is moved rearwardly as above indicated, these lugs pass under the studs 207 and when the lock mechanism has been operated so as to engage the hasps 204 of the cover, these studs and lugs, together with the said lock, make it absolutely impossible to remove the cover or to obtain access to the machinery within the same.

In order to prevent the operating arm 193 from being accidentally moved, a lock mechanism is provided in the end of said arm at its point of junction with the handle 194, the same engaging with a stud or projecting lug 210 on the main casing 1. From the sectional view of the end of the handle shown in Fig. 1ª it will be seen that a recess is provided in the same in which slides a plunger 211 having a slot 212. Through the said slot and through a corresponding slot in the end of the handle 194 extends the operating latch 213, having a head 214 and provided with a diagonally placed slot 215, there being a pin 216 passing through it and held in the body of the plunger 211. There is a spring 217 within the cavity in the handle 194 tending continually to force this plunger outward, such outward motion being, however, prevented by the pin 216. The end of the plunger is normally projected so as to come into engagement with the lug 210 and when it is desired to turn the operating bar in order to operate the machine, pressure on the head 214 of the latch 213 causes the plunger 211 to be moved inwardly owing to the action of the sides of the slot 215 upon the pin 216 and this leaves the operating handle free to be moved past the lug 210.

As shown in Figs. 2, 5, 7, and 9, the lower edge of the front of the cover 8ᵃ is cut away, thereby leaving an open space 218 in addition to which a portion of the lower edge of the left side of said cover is bent upwardly to form a guide piece 219 for the opening thus made. There are also semicircular openings in the side of the cover 8ᵃ just above the channels or slots 220 in the cover plate 8, the said openings being provided in order to permit of the introduction of any suitable hook whereby the upturned ends 221 of the type receptacles 111 and 113 may be engaged and said receptacles withdrawn for changing or cleaning the type therein without necessitating the removal of the cover 8ᵃ.

In operating our improved machine, certain of the keys in the bank, representing the amount of the sale which it is desired to record, are depressed, it however being remembered that whenever it is desired a cipher shall appear in the record, the keys of the corresponding row are to be untouched. The downward motion of any key is transmitted to the lever arms projecting from the sleeves on the various key shafts 13 and 14, these in turn causing longitudinal motion of the type bars 26. Should the key depressed be coupled to one of the upper type bars, or in the machine illustrated, connected to one of the five keys of each row farthest from the front of the machine, one of the forwardly inclined type blocks 42 will be swung on its pivot 40 into a vertical position, the type block having upon it cipher characters and which was previously in the vertical position, being simultaneously swung on its pivot toward the rear. Similarly, if the key depressed belongs to the lower tier or is included in the twenty keys nearest the front of the machine, one of the rearwardly inclined type blocks is actuated, the corresponding cipher type block being swung into the rearwardly inclined position. From an examination of the drawings, it will be seen that such action is caused by the motion of the type bar 26 being transmitted to the type bar 222 from the projections 222ᵃ or 222ᵇ and through said bar to the cipher type bar 48. This action swings the corresponding cipher type block out of the path of the forwardly inclined type block as this is swung to a vertical position by the type bar 26. As the type bar 26 is thus moved rearwardly, the pawl plate 66 is raised by the projection 68 on said type bar until when the type block 42 has finally reached its vertical position and is resting upon the supporting block 39, the said pawl plate drops, under the influence of the spring 65, in front of said projection and thereby retains the type block in the vertical position. This same rearward motion of the type bar brings the projection 60 thereon against one end of the pawl plates 58, thereby causing it to partially turn on its pivot so that its forward end is just in front of the upwardly projecting portions 53 of the four unmoved type bars in the same set on the upper tier.

The motion of the pawl plate 58 has, through the medium of the connecting bar 64, caused the pawl plate 61 to turn on its pivot, thus throwing its forward end into such a position as to prevent rearward motion of the four type bars in its set in the lower tier. It will thus be seen that it is impossible to depress any other key or keys belonging to the same row as that in which a key has been depressed the mechanism above described effectually preventing the injury to the machine otherwise surely resulting from said action. A similar locking action to that described above takes place when one of the type bars of the lower tier is moved, the pawl plate 67 engaging the toothed projection and holding one of the type blocks 43 previously inclined to the rear, in its vertical position upon the block 39, after the cipher carrying type block has been moved out of the way through the medium of the block 222 and the zero type bar 48. Similarly all further movement of the keys of any row is prevented after one of them has been depressed by the projection 63 on any one of the lower tier of type bars engaging its pawl plate 61 so as to turn it on its pivot 57.

Should for any reason, a key in the bank be depressed which it is not desired to have appear in the record, all of the type blocks and keys may be released and returned to their original positions by depressing the key 77. The downward motion of the spindle 75 attached to this key revolves the shaft or spindle 72 through the medium of the arm 74 which presses upward the plate 71 and with it all of the five downwardly extending bars 70. The upward motion of these bars lifts all of the pawl plates 66 and 67 free of the projections 68 and 69 of the type bars in both tiers, thus permitting them to return to their normal positions under the influence of the springs 35 on the key spindles, assisted to a greater or less degree by the springs 50 which press against the rear of the cipher type bars. If now the type whose characters it is desired to appear in the record, have been properly assembled in the vertical position, the sales slip is introduced through the openings in the front and side of the cover 8ª and is moved rearwardly until it is in the desired position. The head of the latch pin 213 is now pressed inwardly so as to draw the plunger 211 clear of the projecting lug 210 and the operating arm is turned through one complete revolution, with the result that duplicate impressions of the desired record are made upon the sales slip, the said record consisting of what is printed by the type blocks as well as the various characters or symbols printed by the movable type fixed in the chase. In addition, the rear portion of said slip having upon it one of the records is cut off and deposited in the receptacle 201 in the rear portion of the machine.

The printing and cutting off operation is accomplished as follows:—After the revolution of the operating arm is begun the first noticeable action of the various parts is the rearward motion of the eccentric rods 149 with their attached bars 145, the eccentrics 151 being so set upon the shaft 152 as to actuate said rods at this time. Such motion of the eccentric rods and connecting bars begins to straighten out the toggle bars 142 and 143, these immediately beginning to move the carriage 133 downward. Since the projecting stud 83 is rigidly fixed to the carriage and is normally in engagement with the projecting portion 86 of the vertical bar 81 this stud now moves the said bar downwardly, swinging the lever 88 on its pivot. This in turn transmits motion to the arm 91, raising it and revolving the shaft 92 into a position such that the curved plate 93 thereon is placed in front of the downwardly extending projections 94 of all of the cipher type bars 48. This effectually prevents motion of said cipher type bars and, in view of the connections between said bars and the type bars 26, similarly prevents motion of any of the forty-five numeral type bars of the machine. As however, the toggle bars are swung on their pivots and the carriage 133 is lowered, the bar 81 in its downward movement is swung on the screw connecting it to the lever 79 as a pivot and owing to the engagement of its curved cam portion with the end of the slot through the main cover plate 8 of the machine, this swinging motion continues until the projection 86 has become disengaged from the stud 83, when under the influence of the spring 89 the said bar 81 is returned to its upper normal position. As however, the stud 83 rises with the carriage, it engages the underside of the projection 86 and carries up with it the bar 81 until said projection is again disengaged by the action of the lower curved cam portion 224 upon the end of the slot through the cover plate 8.

It will be seen that when the bar 81 is moved downwardly, the lever 79 is turned on its pivot, but owing to the fact that its forked forward end simply encircles the spindle 75 without being attached thereto, no motion is transmitted to the latter. When, however, the bar 81 is raised above its normal position by the stud 83 the lever 79 is turned on its pivot to a corresponding extent and its forward end being depressed, revolves the shaft 72 through the arm 74 and raises all of the pawl plates 66 and 67 as above set forth, thereby releasing the type bars and allowing the type blocks and keys to return to their normal positions.

It will be seen that as the carriage 133 is moved downward by the action of its toggles, its knife blade 154 shears past the upwardly projecting blade 101 carried by the movable chase being guided so that it cannot possibly strike directly upon the cutting edge of this blade by means of the piece 104 adjusted to one end of the movable chase as hereinbefore described. From Figs. 5 to 9, it will be noted that the upper knife blade 154 can be adjusted relatively to the knife blade which is fixed in the movable chase by means of the adjusting screws 140. As the downward motion of the carriage is continued, the presser feet 136ª contact with the studs 98ª, the hard rubber blocks 158 simultaneously pressing the main portion as well as the severed portion of the sales slip against the movable chase and carrying said portions with the chase, downwardly, the supporting plungers of the chase compressing the springs under them as such action takes place. This knife constitutes one form of paper dividing device, serving in this particular case to sever the paper completely, but of course if it is preferred, a different form of paper dividing device might with equal facility be used, such for example as a device which cuts or perforates only a portion of the paper or scores the same with an indented dividing line, so as to leave the two portions attached but readily separable by hand, these two various methods of dealing with such divided sales slips or checks being at present well known in the art; and if this form of slip is used, the feed will of course be sufficient extent to feed out both portions of the slip.

As soon as the hard rubber faces 158 of the carriage with the inking ribbon 155, come into contact with the removable type carried in the slots 107, they press the two portions of the sales slip against said ribbon, thereby printing upon said portions the characters carried by said type. As the movable chase passes farther downward the character bearing sections of the assembled blocks enter and pass through the openings 105 in the face of the movable chase and also press the two portions of the sales slip against the inking ribbon, thereby causing impressions to be made thereupon, the type blocks meanwhile being prevented from moving downward by means of the block 39. As the carriage begins to travel up under the action of its toggle bars, the springs 96 force the plungers 97 upward and with them the movable chase, which is limited as to its upward movement by means of the stop 116 and the guide $8^c$. The carriage further continues its upward movement until it is raised to its normal distance above the movable chase, as indicated by the drawings and as determined by the action of the connecting rod 145 upon the various toggle bars supporting said carriage.

As will be seen from Fig. 2, the pinion 119 on the roller 117 is in operative connection with the gear wheel 195 upon the main shaft 152 through the medium of the intermediate gear 196 and is consequently rapidly turned as the said main shaft is rotated by the operating arm 193. The cam 166 is so designed and set upon the shaft 152 that, after the carriage 133 has moved on its upward stroke slightly above the movable chase, the said cam forces the bar 189 downward, thereby turning the bar 184 on its pivot and bringing the rubber covered roller 187 into contact with the rotating roller 117. Since the sales slip introduced into the machine originally projected far enough thereinto to extend over the roller 117, it will be understood that it will be forced in contact therewith by said roller 187, and when this latter is moved down and as soon as the knife blade 154 has severed the rear portion of the sales slip from the main portion, the revolving roller 117 will move said severed rear portion backward and deposit it in the receptacle 201. As the cam 166 continues its revolution, the bar 184 with its roller 187 is forced upwardly by means of the springs 192, which bear upon the surface of the movable chase and keep the roller 191 in contact with the periphery of the cam 166.

The cam groove on the face of the cam 166 is so placed that once in each revolution of the shaft 152 the bar 165 is reciprocated horizontally, moving the forked piece 161 on its pivot 138. Since one end of the double pawl 163 is in engagement with one of the ratchet wheels 160, such reciprocation will turn the said ratchet wheel to an extent depending upon the eccentricity of the above mentioned cam groove and on the size of the teeth, thus causing the winding up of a quantity of the ribbon 155. As the roll of ribbon increases in size, it gradually presses against one of the rollers 181 and through the medium of the roller carrying projection 177 slightly turns the sleeve on its pivot. This projection and the rollers 181 are so designed that at the time the roll of ribbon has reached a predetermined size, the projection 173 on the sleeve 172 has passed its dead point relatively to the plunger 174, the result being that said plunger bears upon said projection 173 so as to turn the sleeve 172 rather violently on its pivot. Such motion brings the lug 180 into relatively violent contact with the pin 164 on one end of the double pawl 163, thereby also moving the downwardly extending projection on said pawl over the top of the plunger 169 as said pawl is turned into contact with the second ratchet wheel 160.

Further reciprocating motion of the bar 165 will cause the second ratchet wheel to be periodically turned with the result that the ribbon is wound up on the second roller 153, being unwound from the first one. The turning of the sleeve 172 on its pivot brings the second roller 181 into contact with the second or small roll of ribbon where it remains until this small roll has grown in size sufficiently to again move the sleeve 172 and its projection 173 over the dead point.

At any desired intervals the drawer 198 may be removed and the interior casing 201 taken therefrom, it being understood that the detached ends of the sales slips in said casing contain a duplicate record of each sale together with the date, number of the machine, etc., the same as what has been printed upon the rear portion of said slips. From an inspection of Fig. 1, it will be seen that the cover $8^a$ over the upper framework and its attached mechanism is held in position by two lugs 204, which are engaged by the lock and by the two studs 207 projecting from the side plates 123 of said upper frame of the machine, these studs being in engagement with plates or projections 206 on the inside surface of said cover $8^a$. The various screws retaining the cover plate in position, as well as certain of those holding the said plates 4, are inclosed or protected by the cover $8^a$; it being thus impossible to obtain access to any portion of the machine except by operating the lock, which, it will be understood, acts to hold the cover $8^a$ in place, as well as to retain the drawer 198 within the machine.

We do not care to limit our machine to sales recording machines as the same may be used in banks, post-offices, counting houses, and in like places where it is desired to set up certain amounts, print these amounts in duplicate on a slip or check and sever one of the printed portions from the slip so that it will be filed away in the machine as a permanent record against the corresponding printed statement on the remainder of the slip which can be withdrawn and used for any desired purpose.

Having thus described our invention what we claim as new and desire to secure by Letters Patent is:

1. In a machine of the class described, the combination of duplicate printing types, of spaced platens for forcing a slip against said types, a knife located between said platens and means for retaining within the machine one of the printed portions of a slip severed by said knife.

2. In a machine of the class described, the combination with the printing devices, of spaced platens, a knife between said platens, a printing ribbon and supports for said ribbon whereby it passes under the platens and over the knife.

3. In a machine of the class described, the combination with a printing mechanism, of a stationary knife, a movable knife, a spring normally forcing the movable knife against the stationary knife when said movable knife is actuated and an adjustable stop for limiting the movement of the movable knife toward the stationary knife during the cutting operation.

4. In a machine of the class described, the combination with a printing mechanism, of the actuating devices for severing a voucher from a slip and the feeding rollers for said voucher normally out of operative position but arranged to be brought into such position to feed the voucher forward after the same has been severed.

5. In a machine of the class described, the combination with a series of type carriers for printing zeros normally in printing position, of a series of type carriers for printing numerals other than zero, an operating handle, means for locking the zero type carriers after the handle has moved from normal position and means for locking the numeral type carriers when the zero type carriers are locked.

6. In a machine of the class described, the combination with a series of keys, of a series of pivoted type-carriers, a series of bar connecting said keys and carriers and arranged in groups, locking pawls for locking the bars of a group in which one bar has been operated, a common operating mechanism, and means actuated by said mechanism for locking all the unoperated bars.

7. In a machine of the class described, the combination with a series of pivoted laterally movable type carriers each formed with duplicate printing types both located in the same plane of pivotal movement and means for moving the carriers laterally when they are moved pivotally to bring both of their types to printing position.

8. In a machine of the class described, the combination with a series of keys, of a series of type carriers, a series of bars connecting said keys and carriers and arranged in groups, locking pawls for locking the bars of a group in which one bar has been operated, an operating handle and means actuated by said handle for locking all of the unoperated bars.

9. In a type operating device for a sales recording machine, the combination of type blocks, type bars connected thereto, key spindles carrying keys, a key shaft and a plurality of independent sleeves on said shaft, said sleeves having projecting arms of which certain are connected to the type bars and others to the key spindles, substantially as described.

10. In a type operating device for a sales recording machine, the combination of type blocks, type bars connected thereto, key spindles carrying keys, a key shaft, a plurality of sleeves on said shaft, and arms having projections, certain of said arms being connected to the key spindles and others being connected to the type bars, certain of the sleeves being operatively connected through the medium of the key shafts, substantially as described.

11. In a type operating device for a sales recording machine, the combination of type blocks, type bars connected thereto, key spindles carrying keys, a key shaft and a plurality of sleeves on said shaft connecting the type bars and the key spindles, substantially as described.

12. In a type operating device for a sales recording machine, the combination of type blocks, type bars connected thereto, key spindles carrying keys, a key shaft and sleeves on said shaft, the type bars being connected to the key spindles by means of said sleeves, certain of the sleeves being operatively connected to each other through the key shaft and others being free to turn independently of the same, substantially as described.

13. In a type operating device for a sales recording machine, the combination of type blocks, a shaft having on it sleeves, type bars connecting the type blocks with certain of said sleeves, means for operatively connecting certain of the sleeves to each other, the same permitting independent action of the remaining sleeves, keys and key spindles connecting the keys with a number of the sleeves on the shaft, substantially as described.

14. In a type operating device for a sales recording machine, the combination of two type blocks, a key shaft having on it three sleeves, type bars connecting the type blocks with two of said sleeves, means for operatively connecting one of said two sleeves with the third, two key spindle carrying keys connected respectively to the second and third of the sleeves, substantially as described.

15. In a type operating device for a sales recording machine, the combination of type blocks, a key shaft having on it three sleeves, the first and third of said sleeves being operatively connected to each other through said shaft, type bars connecting the type blocks with the first and second of the sleeves, and two key spindles carrying keys connected respectively to the second and third of the sleeves, substantially as described.

16. In a type operating device for a sales recording machine, the combination of type blocks, a key shaft having on it five sleeves, means for connecting the first two of said sleeves to two others to form independent pairs, type bars connecting the two first sleeves and the single sleeve respectively to the type blocks, and key spindles connected to the single sleeve and to the two sleeves not directly connected to the type bars, substantially as described.

17. The combination of a key shaft having a plurality of sleeves, means for operatively connecting four of said sleeves in two independent pairs, a fifth sleeve carried by and movable upon others of the sleeves, type blocks having type bars whereby they are connected to the fifth sleeve and one of each pair of sleeves respectively, and key spindles having keys, said spindles being connected respectively to the second sleeve of each pair and to the fifth sleeve, substantially as described.

18. In a type operating device for a sales recording machine, the combination of a number of rows of keys, a number of series of type blocks having type bars, a plurality of key shafts for each row of keys, at right angles to said rows, with mechanism on said shafts whereby the keys on one side of the machine are connected to type bars on the opposite side thereof, substantially as described.

19. In a type operating device for a sales recording machine, the combination of a number of sets of key shafts, a line of keys for each set, a number of series of type blocks, type bars therefor, with mechanism on one shaft of each set for connecting a portion of the keys of the corresponding line with certain of the type bars, and mechanism on the second shaft of each set for connecting the remaining keys of the line to the remainder of the type bars for that line, substantially as described.

20. In a type operating device for a sales recording machine, the combination of a number of sets of key shafts, a line of keys for each set, a number of series of type blocks, type bars therefor, with mechanism on one shaft of each set connecting the keys of one end of the corresponding line with certain of the type bars on the opposite side of the machine, and mechanism on the other shaft of each set connecting the keys of the other end of the corresponding line with certain of the type bars on the side of the machine opposite thereto, substantially as described.

21. The combination of a number of keys, a number of type blocks having upon them duplicate characters and operatively connected to the keys, means for taking an impression from certain of said type blocks assembled by operation of the keys and means between the characters on each block to cut the material upon which an impression is made, substantially as described.

22. The combination of a number of series of keys, series of type blocks operatively connected with the keys, whereby a number of said blocks may be assembled, each of said type blocks consisting of a plurality of united sections each having a printing face, together with means constructed to act between the sections of the assembled type blocks for cutting a piece of material and means for taking an impression from the assembled type upon said material, substantially as described.

23. The combination of a number of multiple faced type blocks, keys for assembling said type blocks into predetermined positions, mechanism for taking an impression upon a piece of material from said assembled type blocks and thereby printing upon the same a number of lines of characters, with means operated by the printing mechanism for cutting the piece of material between the lines of characters, substantially as described.

24. The combination of a number of multiple faced type blocks, means for assembling said blocks into predetermined positions, a movable chase having openings for the printing faces of the type blocks, a movable carriage for taking an impression from the assembled type upon a piece of material inserted between said carriage and the movable chase, and means carried by said carriage for cutting the material printed upon, said means acting between the openings in the movable chase, substantially as described.

25. The combination of a number of multiple faced type blocks, means for assembling said blocks into predetermined positions, a movable chase having openings for the printing faces of the type blocks, a knife blade extending between said openings and a movable carriage for taking an impression from the assembled type upon a piece of material inserted between said carriage and the movable chase, and a second knife blade carried by said carriage and coacting with the blade in the movable chase for cutting said piece of material, substantially as described.

26. The combination of a number of substantially U-shaped type blocks, each block having the same character upon its ends, mechanism for assembling any of said blocks at will, a movable chase, openings for the character bearing ends of the assembled type, a cutting member carried by the said chase and extending between the ends of the said type blocks when the machine is operated, mechanism for taking an impression upon a piece of material placed upon the chase, and a second cutting member carried by the printing mechanism and coacting with the first cutting member, substantially as described.

27. The combination in a type operating device for a sales recording machine, of keys, type blocks, mechanism connecting the keys with the type blocks whereby said blocks may be assembled by the manipulation of the keys, and a device for locking said mechanism in position after a type block or blocks have been assembled, and thereby preventing further operation of the keys until the assembled type blocks have been returned to their normal positions, substantially as described.

28. The combination of a number of type bars with a pawl pivotally supported, each of said bars having a cam surface constructed to engage one end of said pawl and turn it on its pivot when one of the bars is moved longitudinally, said bars also being constructed to be engaged by the second end of the pawl when it has been so turned on its pivot and thereby be prevented from motion until the pawl has been returned to its normal position, substantially as described.

29. The combination of keys, type blocks, mechanism operatively connecting said keys with the type blocks, means for taking an impression from certain of the type blocks when these have been assembled by operation of the keys, and means for locking all of the keys to prevent motion thereof during the operation of the device for taking an impression from the type blocks, substantially as described.

30. The combination of keys, type blocks, mechanism connecting the keys and the type blocks, a movable carriage for causing an impression to be taken from said type blocks, with means operated by said carriage, whereby all of the keys are locked to prevent movement thereof during the operation of the carriage in taking an impression from the assembled type blocks, substantially as described.

31. The combination of keys, type blocks, mechanism connecting the keys and the type blocks, the same including type bars, a movable carriage for taking an impression from type blocks assembled by operation of the keys, and a device operative upon said type bars, whereby further motion of the same is prevented during the operation of the carriage in taking an impression, substantially as described.

32. The combination of keys, type blocks, mechanism including type bars connecting the same, a reciprocating carriage constructed to cause an impression to be taken from type assembled by operation of the keys, and a device operated by motion of the carriage and engaging certain of the type bars whereby, after motion of the carriage has begun and during its continuance, further operation of the keys to assemble additional type blocks is prevented, substantially as described.

33. In a sales recording machine, the combination of movable type blocks, means for assembling certain of the same, a movable carriage for taking an impression from the assembled type blocks, a knife carried by the carriage and an inking ribbon passing around said knife and placed to engage the faces of the assembled type blocks on each side of said knife, substantially as described.

34. The combination of a number of type blocks, means for bringing certain of said blocks into an assembled position, a movable carriage having a knife blade and provided with surfaces parallel to the faces of the characters of the assembled type and an inking ribbon supported on the carriage and extending across the said surfaces thereon and around the knife blade, substantially as described.

35. The combination in a sales recording machine, of a number of double faced type, means for bringing certain of said type into an assembled position, a movable carriage having surfaces extending substantially parallel to the plane of the characters upon the assembled type, a knife supported on the carriage and extending between two surfaces thereof, rollers also supported on the carriage and an inking ribbon extending from one roller across one of the surfaces on the carriage, around the knife, across the second surface of the carriage and to the second roller, substantially as described.

36. The combination in a sales recording machine of a number of type blocks provided with means whereby certain of said blocks may be brought to an assembled position, a movable chase supported over the assembled blocks, a cutting edge carried thereby, a movable carriage normally held in an elevated position over the movable chase, a knife blade carried thereby, a pressing surface on each side of said knife, a roller situated between said surfaces and above the knife, and an inking ribbon carried by the carriage and extending over said surfaces and the roller, substantially as described.

37. In a machine of the character described, the combination of a movable carriage, ribbon rollers carried thereon, ratchet wheels carried by said rollers, a pawl placed to engage said ratchet wheels, a main shaft having mechanism connecting it to the carriage, whereby the revolution of said shaft causes the carriage to be reciprocated, a cam on said shaft and mechanism connecting the cam with the said pawl, whereby the pawl is brought into engagement with the ratchet wheels when the shaft is revolved, substantially as described.

38. In a device of the character described, the combination of a movable carriage, two ribbon rollers supported thereon, a pawl pivotally supported on the carriage, ratchet wheels on the rollers placed to be engaged by said pawl, means for reciprocating said carriage, operative mechanism connecting said means with the pawl, and mechanism whereby said pawl is brought into engagement with one of the ratchet wheels whenever a predetermined amount of ribbon has been wound upon the roller to which the other ratchet wheel is connected, substantially as described.

39. In a machine of the character described, the combination of a movable carriage, a knife blade and rollers provided with inking ribbon carried thereby, two toggles at each end of said carriage normally retaining the same in an elevated position, a main shaft having cams upon it, links connecting each pair of toggles with each other and with one of the cams, whereby the carriage is reciprocated when the main shaft is revolved, substantially as described.

40. The combination in a sales recording machine, of a number of type blocks, means for bringing certain of said blocks into an assembled position, means for retaining said blocks in such position, a movable carriage for taking an impression from the assembled type, and mechanism operated by motion of said carriage for releasing said mechanism retaining the type blocks in the assembled position, thereby allowing them to return to their normal positions, substantially as described.

41. In a sales recording machine, the combination of a number of type blocks, mechanism for bringing certain of said blocks to an assembled position, means for retaining them in such position, a carriage movable toward and from the assembled type for taking an impression therefrom, and mechanism operated by said carriage as it moves away from the type, whereby said retaining mechanism is made to release the type, thereby permitting them to return to their normal positions, substantially as described.

42. The combination in a sales recording machine, of type blocks, keys, type bars connecting the type blocks and said keys, pawls for engaging the type bars and retaining them in a position corresponding to the assembled position of the type blocks, with mechanism operated by said carriage as it moves away from the blocks constructed to cause the pawls to disengage the type bars and thereby permit the type to assume their normal position, substantially as described.

43. In a sales recording machine, the combination of type blocks, keys, type bars connecting the keys to said blocks, means tending to retain type blocks in their normal position, pawls whereby the type blocks are locked in an assembled position, a movable carriage for taking an impression from the assembled type blocks, a pivoted lever having means connecting it with the pawls for the type bars, and means on the carriage engaging said lever when the carriage is moved, with means whereby the lever is caused to operate the pawls to release the type bars and allow the type blocks to return to their normal position, the same being operative only when the carriage is moved away from the assembled type blocks, substantially as described.

44. In a sales recording machine, the combination of type blocks, keys and type bars connecting the keys with the type blocks, means tending to retain the type blocks in their unassembled position, pawls for retaining the blocks in their assembled position after they have been moved thereto by operation of the keys, a device for disengaging the pawls from said type blocks at will, a movable carriage for taking an impression from the assembled type blocks, and mechanism connecting said carriage and the said releasing device, whereby the latter is operated whenever the carriage is moved to take an impression from the type blocks, substantially as described.

45. The combination in a sales recording machine, of type blocks, keys and type bars connecting the keys with the said blocks, means engaging the type bars for retaining the type blocks in an assembled position and means tending to return said type blocks to their normal position, means for disengaging the said retaining means from the type bars at will, a carriage movable toward and from the assembled type bars, a device connecting said carriage with the said releasing device and means for causing said connecting device to operate upon the releasing device only as the carriage is moved away from the assembled type, thereby permitting the same to return to their normal position, substantially as described.

46. The combination in a machine of the character described, of a series of movable type blocks, means for bringing the same into an assembled position, a carriage movable toward and from said type blocks, means for operating said carriage, a stationary roller, having means whereby it is revolved from said operating means, and a second roller provided with means whereby it is brought into contact with the first roller when the carriage is operated, substantially as described.

47. In a machine of the character described, the combination of type, means for assembling the same, a movable chase, a reciprocatable carriage for taking an impression from the assembled type, means for operating said carriage, a roller adjacent to the movable chase having means whereby it is revolved from said operating means, pivoted arms supported on the framework of the machine, a roller carried by said arms, means connecting the arms with the operating means, whereby the roller carried thereby is caused to co-act with the roller adjacent to the movable chase when the carriage is reciprocated, substantially as described.

48. In a machine of the class described, the combination with a setting mechanism, of a series of type-carriers arranged in groups, and each of which is provided with duplicate types and cam guiding means for moving the types of each group to a common printing point and so constructed that the duplicate types of a set carrier will project to opposite sides of a point represented by the cam surface having the highest operative capacity.

49. In a machine of the class described, the combination with a series of keys, of a series of type-carriers one for each key, and each of the same provided with spaced duplicate types, check feeding devices, and a knife arranged to sever a check strip at a point intermediate the impression points of any two duplicate types.

50. In a machine of the class described, the combination with a series of type-carriers, means for latching the carriers in their set positions, a platen, and means operated by the platen for releasing the carriers after the platen has made an impression from said carriers.

51. In a machine of the class described, the combination with a series of keys, of a series of type carriers controlled thereby, each of said type carriers being provided with spaced duplicate types, a paper dividing device, and means for operating the latter to engage the paper between the impression points of said duplicate types.

52. In a machine of the class described, the combination with a series of keys, of a series of type carriers controlled thereby, each of said type carriers being provided with spaced duplicate types, a duplicate platen for taking a simultaneous impression from the duplicate types, and a paper dividing device mounted upon said platen and positioned to engage the paper at a point intermediate the impression points of the duplicate types.

53. In a machine of the class described, the combination with a series of keys, of a series of type carriers controlled thereby, each of said type carriers being provided with spaced duplicate types, a duplicate platen for taking a simultaneous impression from the duplicate types, a paper dividing device mounted upon said platen and positioned to engage the paper at a point intermediate the impression points of the duplicate types, and a paper feeding device with means for bringing the same into operative effectiveness at the end of the impression movement of the platen.

54. In a machine of the class described, the combination with type carriers provided with spaced duplicate types, a paper dividing device, means for causing the device to engage the paper between the impression points of said duplicate types, and means for positively gripping and feeding the divided paper.

55. In a machine of the class described, the combination with type carriers provided with spaced duplicate type, a paper dividing device, means for operating the said device to sever the paper between the impression points of said duplicate types and a roller for positively feeding the severed slip in the machine.

56. In a machine of the class described, the combination with type carriers, having spaced duplicate type and keys controlling their movement to printing position, of a paper dividing device, means for operating the same to sever a slip between the spaced impressions thereon, a locked receptacle in the machine and means operated by the machine for positively feeding a severed slip to a receptacle in the machine.

57. In a machine of the class described, the combination with type carriers having spaced duplicate type, and manipulative means controlling their movement to printing position, a paper cutting device, means for moving same to separate a slip between the spaced impressions thereon, and rollers operated by the machine for feeding a severed slip in the machine.

58. In a machine of the class described, the combination with type carriers provided with spaced duplicate type, of means for printing from said type in duplicate on a record, a paper severing device adapted to sever the record between the spaced printing impressions and means for moving the same, a receptacle in the machine and means for feeding the severed slip into the receptacle by the operation of the machine.

59. In a machine of the class described, the combination with type carriers, of means for making duplicate impressions on a record material from said carriers, means for severing the record material between said impressions, a feeding roller for the severed portion of the record material and connections for rotating said roller, a second feeding roller, and means for moving the second roller bodily into frictional contact with said first roller, whereby rotation of said first roller will feed the severed portion of the record material.

60. In a machine of the class described, the combination with printing devices and means for taking impressions from same, of paper feeding rollers, a pivoted support for one of said rollers and means for moving said support to bring the rollers into frictional contact and then feeding said paper by rotating the rollers.

61. In a machine of the class described, the combination with type carriers, of means for making duplicate impressions on a record material from said carrier, means for severing the record material between said impressions, a feeding roller for the severed portion of the record material and a movable support on which said roller is mounted, a driving roller with connections for rotating it, and means for actuating said support to move the first roller bodily into frictional contact with said driving roller and thereby cause actuation of said feeding roller also.

62. In a machine of the class described, the combination with type carriers, of means for making a plurality of impressions on a record material from said carriers, means for dividing said paper between said impressions, a receptacle in the machine, and means for positively feeding the severed record to said receptacle.

63. In a machine of the class described, the combination with type carriers, of means for making a plurality of impressions on a record material from said carriers, a knife for dividing said material between impressions, a receptacle in the machine, and rollers for feeding a severed record to said receptacle.

64. In a machine of the class described, the combination with printing devices and means for taking impressions of same on a record material, of a casing for the machine, a receptacle therein for holding severed portions of said material, and a lock preventing removal of said casing to give access to said receptacle.

65. In a machine of the class described, the combination with manipulative devices, means for holding said manipulative devices in adjusted position, and a special key for releasing said holding means; of an operating mechanism, a bar operated in opposite directions successively from a normal central position by said operating mechanism, connections from said bar for locking said manipulative devices when said bar is moved in one direction, and connections from said bar serving to operate said special key when said bar is moved in the other of its directions.

66. In a machine of the class described, the combination of duplicating printing frames, of duplicate platens and a knife located between the platens and movable therewith and rollers for positively feeding a severed slip of printed material.

67. The combination of a number of multiple faced type blocks, keys for assembling said type blocks into predetermined positions, mechanism for taking an impression upon a piece of material from said assembled type blocks and thereby printing upon the same a number of lines of characters, with means operated by the printing mechanism for cutting the piece of material between the lines of characters, substantially as described.

68. In a machine of the class described, the combination with manipulative devices, means for holding said manipulative devices in adjusted position, and a manipulative device for releasing said holding means; of an operating mechanism, an element given two movements by said operating mechanism, means controlled by said element in one of its movements for obstructing said first manipulative device, and means controlled by said element in the other of its movements for operating said releasing manipulative device.

69. In a machine of the class described, the combination with type-carriers, of a printing support for slips, means for making duplicate printing impressions on the inserted slip, means for severing the slip between the two impressions, with provisions existing by virtue of which one portion of the slip is retained within the machine while the other portion is permitted to be withdrawn.

In testimony whereof, we have signed our names to this specification, in the presence of two subscribing witnesses.

FRANKLIN N. BREWER.
STEPHEN B. TILY.
JOHN G. REHFUSS.
MARTIN O. REHFUSS.

Witnesses:
WILLIAM E. BRADLEY,
JOS. H. KLEIN.